United States Patent
Lohmar et al.

(10) Patent No.: US 11,924,038 B2
(45) Date of Patent: Mar. 5, 2024

(54) UE-INITIATED IN-BAND POLICY ACTIVATION FOR FLOW-BASED POLICIES

(71) Applicant: Telefonaktiebolaget LM Ericsson (publ), Stockholm (SE)

(72) Inventors: Thorsten Lohmar, Aachen (DE); Bastian Cellarius-Toups, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/012,113

(22) PCT Filed: Jun. 28, 2021

(86) PCT No.: PCT/EP2021/067679
§ 371 (c)(1),
(2) Date: Dec. 21, 2022

(87) PCT Pub. No.: WO2022/002843
PCT Pub. Date: Jan. 6, 2022

(65) Prior Publication Data
US 2023/0246915 A1    Aug. 3, 2023

Related U.S. Application Data

(60) Provisional application No. 63/047,768, filed on Jul. 2, 2020.

(51) Int. Cl.
*G06F 15/173*    (2006.01)
*H04L 41/0894*   (2022.01)
*H04M 15/00*     (2006.01)

(52) U.S. Cl.
CPC ........ *H04L 41/0894* (2022.05); *H04M 15/66* (2013.01); *H04M 15/8016* (2013.01)

(58) Field of Classification Search
CPC .............. H04L 41/0894; H04M 15/66; H04M 15/8016
See application file for complete search history.

(56) References Cited

U.S. PATENT DOCUMENTS

2020/0059992 A1*   2/2020   Skog ...................... H04L 45/38

OTHER PUBLICATIONS

3rd Generation Partnership Project; "3rd Generation Partnership Project; Technical Specification Group Services and System Aspects; System architecture for the 5G System (5GS); Stage 2 (Release 16)", 3GPP TS 23.501 V16.4.0 (Mar. 2020), Technical Specification, pp. 1-430.

(Continued)

*Primary Examiner* — Wing F Chan
*Assistant Examiner* — Joseph R Maniwang
(74) *Attorney, Agent, or Firm* — COATS & BENNETT, PLLC

(57) ABSTRACT

A method in a User Plane Function (UPF) comprising receiving from a Policy Control Function (PCF), an instruction to create a new Packet Detection Rule (PDR), the instruction comprising an IP address for the wireless device, a value of a ToS field, and a quality-of-service, QoS, reference or charging policy. The method further comprises storing the IP address, the value of the ToS field, and the QoS reference or charging policy as a predetermined PDR. The method further comprises subsequently receiving, from a wireless device, a first packet targeted to an application server, AS, mapping the first packet to the predetermined PDR, based on a value of a ToS, field in the first packet, and adding a 5-tuple associated with the first packet to the predetermined PDR. This serves to bind the new connection to the PDR.

18 Claims, 18 Drawing Sheets

(56) References Cited

OTHER PUBLICATIONS

3rd Generation Partnership Project; "3rd Generation Partnership Project; Technical Specification Group Services and System Aspects; 5G Media Streaming (5GMS); General description and architecture (Release 16)", 3GPP TS 26.501 V16.3.1 (Mar. 2020), Technical Specification, pp. 1-63.

* cited by examiner

UE-INITIATED IN-BAND POLICY ACTIVATION FOR FLOW-BASED POLICIES

TECHNICAL FIELD

The present disclosure is generally related to quality-of-service (QoS) control and charging control in wireless networks and is more particular related to techniques for in-band activation of QoS and/or charging control policies for data flows.

BACKGROUND

In telecommunications networks standardized by the members of the 3rd-Generation Partnership Project (3GPP), currently only IP-Multimedia Subsystem (IMS) applications running on UEs can activate dedicated bearers/quality of service (QoS) flows using Session Initiation Protocol (SIP) signaling. There is no standard yet for non-UE-based applications to define the activation of a QoS flow with another protocol for Transport Control Protocol (TCP)-based application flows.

A QoS flow (a dedicated bearer in 4G terminology) is used for flow-based QoS, e.g., to provide higher QoS for speech service than for other services. In the future, it should be possible to activate flow-based charging models without activating a QoS flow. In a 5G system, charging involves only functions in the user plane function (UPF).

SIP/IMS use primarily the user datagram protocol (UDP) for user-plane communication. For example, SIP signaling is used to establish a Real-Time Protocol (RTP)/UDP pipe for the speech media plane. With SIP/IMS, the user-plane resources are negotiated via SIP before first usage of the user plane resources (ports).

Many applications use TCP to carry the user-plane data. In the automotive context, for example, a software update from a vehicle often uses hypertext transfer protocol (HTTP) to get the software update package from a content delivery network (CDN) server into the vehicle. In 3GPP, work is ongoing to standardize the 5G Media Streaming Architecture (3GPP TS 26.501 (Stage 2) and 3GPP TS 26.512 (Stage 3)). Here, application layer signaling between a UE application client (called SGMS Client in 3GPP TS 26.501) and an Application Function (SGMS AF in 3GPP TS 26.501) to activate different dynamic policies is standardized. There are different use cases foreseen (See S4-20888), including QoS activation, policy-based throttling ("Binge-On"), and charging separation. Note that no dedicated bearer/QoS flow is needed for policy-based throttling or charging separation, since this is handled inside the UPF.

Traffic flows in the network are often identified using 5-tuples. The 5-tuple contains the IP addresses of the client and the server, the protocol id (e.g., TCP or UDP) and the source and destination ports. In case of fetching a file from a CDN, the source port (client-side port) is a key differentiator of traffic flows from the same device. The destination port is either port 80 (HTTP) or port 443 (HTTPS). A problematic aspect is that the client only knows the source port after the TCP connection is established. The TCP stack allocates a free source port when the TCP connection establishment starts (the SYN packet is sent).

SUMMARY

For IMS, dedicated bearers/QoS flows are always identified using a 5-tuple. SIP signaling is used to provide the 5-tuple from the UE application (the SIP client) to the Policy Control Function (PCF). The Proxy Call Session Control Function (P-CSCF) parses the Session Description Protocol (SDP) object and triggers the according call using the Rx or N5 interface. In SIP, the user plane is always established via SIP signaling, i.e., out of band. The PCF gets the 5-tuple parameters before the first packet is send via the user-plane. Accordingly, using 5-tuples for mapping a flow to a charging policy or QoS policy before the flow begins is not a problem in IMS.

The same is not true for HTTP-based traffic. For HTTP-based traffic, the source TCP port only becomes known during the establishment of a TCP connection. Thus, an essential 5-tuple component (i.e., the source port) is only available to the PCF after establishing the TCP connection. For this and other reasons, improved techniques for setting up and activating charging and/or QoS policies are needed.

Various embodiments of the techniques and devices described herein address these problems by using a type-of-service (ToS) field in uplink (UL) packets, in combination with the client IP or a server IP or server name indication (SNI), to trigger the binding of the 5-tuple of a newly existed connection to an existing Policy and Charging Control (PCC) rule, e.g., to a policy for QoS or charging separation. In addition, in some embodiments the Packet Detection Rules (PDRs) in the UPF may be modified in such a way that the downlink traffic (typically not ToS-marked or marked incorrectly) is handled according to the PCC rule that applies to the corresponding uplink traffic.

An example method according to some of the techniques described herein may be implemented in one or more network nodes acting as a User Plane Function (UPF), and begins with a process of setting up a PDR in the UPF, to which one or more subsequent connections can be associated, or "bound." This example method further includes the step of receiving, from a PCF, an instruction to create a new PDR, the instruction comprising an IP address for the wireless device, the value of the ToS field, and a quality-of-service (QoS) reference or charging policy, i.e., some value or parameter that ties the PDR to a particular QoS policy or flow or to a particular charging rule or category. This method continues with storing the IP address, the value of the ToS field, and the QoS reference or charging policy as a predetermined PDR.

This example method continues further with subsequently receiving, from a wireless device, a first packet targeted to an application server (AS). This may be the first packet of a newly established TCP connection, e.g., a TCP SYN packet. The method further comprises mapping the first packet to the predetermined PDR, based on a value of a ToS, field in the first packet and adding a 5-tuple associated with the first packet to the predetermined PDR. This serves to bind the new connection to the PDR.

Another example method might be implemented in one or more network nodes acting as an application function (AF). This example method comprises receiving, from a mobile gateway associated with a wireless device, a request to set up a policy, the request comprising a type-of-service, ToS value, and a quality-of-service (QoS) behavior and/or charging behavior to associate with the ToS value. The method further comprises sending, to a policy control function, in response to the request, an instruction to create a new packet detection rule, PDR, the instruction comprising an IP address for the wireless device, the ToS value, and a QoS reference or charging policy reference.

Another example method might be implemented in one or more network nodes acting as a policy control function (PCF). This method comprises the step of receiving, from an application function, AF, an instruction to create a new packet detection rule, PDR, the instruction comprising an IP address for a wireless device, a type-of-service, ToS, value, and a quality-of-service, QoS, reference or charging policy reference. The method further comprises the step of creating a new packet detection rule, PDR, in response to the instruction, the new PDR comprising the IP address for the wireless device, the ToS value, and the QoS reference or charging policy reference. The method further comprises the step of sending, to a user plane function, UPF, an instruction to create a new packet detection rule, PDR. This instruction comprises the IP address for the wireless device, the ToS value, and the QoS reference or charging policy reference.

Still another example method may be implemented in a wireless device. This example method comprises the step of receiving, from a policy control function, PCF, an instruction to create a packet detection rule, PDR, the request comprising an IP address for the wireless device, a value for a type-of-service, ToS, field, and a quality-of-service, QoS, reference. This method further comprises creating a service data flow filter, based on the ToS field and the QoS reference, and subsequently detecting the value for the ToS field in one or more uplink packets and mapping the one or more uplink packets to a QoS flow, according to the service data flow filter.

Yet another example method may be implemented in one or more nodes operating network address translation, NAT, in a network. This method comprises receiving, from a user plane function, UPF, a first packet originating from an application associated with a wireless device, the first packet being addressed to an application server. The method further comprises performing NAT for the first packet and forwarding the first packet to the application server. A type-of-service, ToS, value from a ToS field in the first packet is stored, in association with a 5-tuple corresponding to the first packet. The method comprises subsequently receiving a second packet, from the application server and matching a 5-tuple corresponding to the second packet to the stored 5-tuple corresponding to the first packet. The method still further comprises rewriting a ToS field in the second packet, using the stored ToS value, and performing NAT for the second packet and forwarding the second packet to the UPF for forwarding to the wireless device.

Apparatuses and systems corresponding to the above-described methods, and variants thereof, are also described in the following detailed description and illustrated in the attached figures.

DETAILED DESCRIPTION

Figure 1:
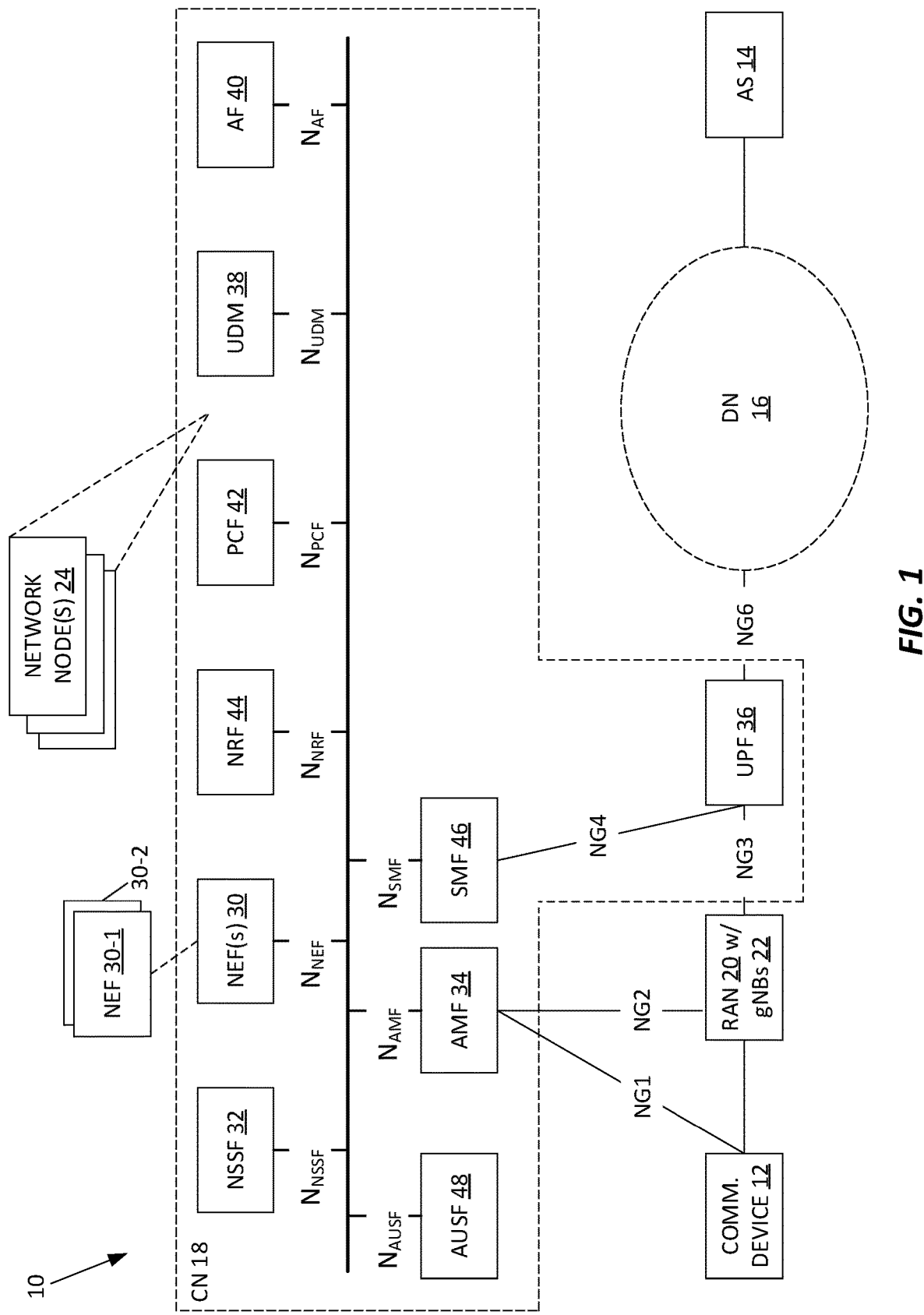
FIG. 1 is a block diagram of one embodiment of a communication network.

FIG. 1 illustrates a communication network 10, also referred to as network 10, using example nomenclature associated with Fifth Generation (5G) New Radio (NR) wireless communication networks conforming with the applicable Technical Specifications (TSs) promulgated by the Third Generation Partnership Project (3GPP). See, for example, 3GPP TS 23.501 V16.2.0 (2019-09-24). However, the methods and apparatuses disclosed herein are not limited to implementations of the network 10 based on 5G/NR standards, and it will be understood that other network standards or types may use different nomenclature to identify the same or similar underlying functionalities.

The network 10 supports a potentially large number of communication devices 12, although for simplicity the diagram depicts only one communication device 12. Communicative coupling by the network 10 of the communication device 12 to an external Data Network (DN) 16 provides the communication device 12 with access to an Application Server (AS) 14. In an example case, the AS 14 belongs to a third party—not owned by the owner/operator of the network 10—and the communication device 12 runs one or more software applications that involve the exchange of communications between the communication device 12 and the AS 14. For example, the communication device 12 is an embedded communication device, such as an MTC or IoT device, that performs monitoring or control and exchanges related data and control signaling with the AS 14. There may be many such communication devices 12 being supported by the network 10, and that large plurality of communication devices 12 may involve different types of devices and different types of communication services.

Correspondingly, the network 10 may couple to additional ASs 14 through the same or additional DNs 16. For example, there may be multiple third parties, each providing one or more ASs 14, and each deploying potentially large groups or sets of communication devices 12 that are credentialed or otherwise authorized to access their respective ASs 14 through the network 10. As such, the network 10 in one or more operational scenarios supports different groups or kinds of communication devices 12, such as multiple groups or kinds of IoT devices.

Among its constituent parts or portions, the network 10 includes a Core Network (CN) 18 and a Radio Access Network (RAN) 20, with the RAN 20 providing radio links for connecting to respective communication devices 12. The RAN 20 includes a number of access points, such as base stations or other types of radio transceiver nodes. In the 5G/NR context, the term "gNB" denotes radio base stations and the example RAN 20 includes one or more gNBs 22.

The CN 18 includes one or more Network Exposure Functions (NEFs) 30, one or more Network Slice Selection Functions (NSSFs) 32, one or more Access and Mobility Management Functions (AMFs) 34, one or more User Plane Functions (UPFs) 36, one or more Unified Data Managements (UDMs) 38, one or more Application Functions (AFs) 40, one or more Policy and Control Functions (PCFs) 42, one or more Network Repository Functions (NRFs) 44, one or more Session Management Functions (SMFs) 46, and one or more Authentication Server Functions (AUSF) 48. One or more network nodes 24 implement the foregoing array of functions, e.g., one or more appropriately configured computer servers or other computer-based processing nodes with interface circuitry for inter-function communications.

A change in 5G networks (e.g., in 5GC) is that traditional peer-to-peer interfaces and protocols (e.g., those found in LTE/EPC networks) are modified by a so-called Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. In order to access a service, both the service name and the targeted service operation must be indicated. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context.

Figure 2:
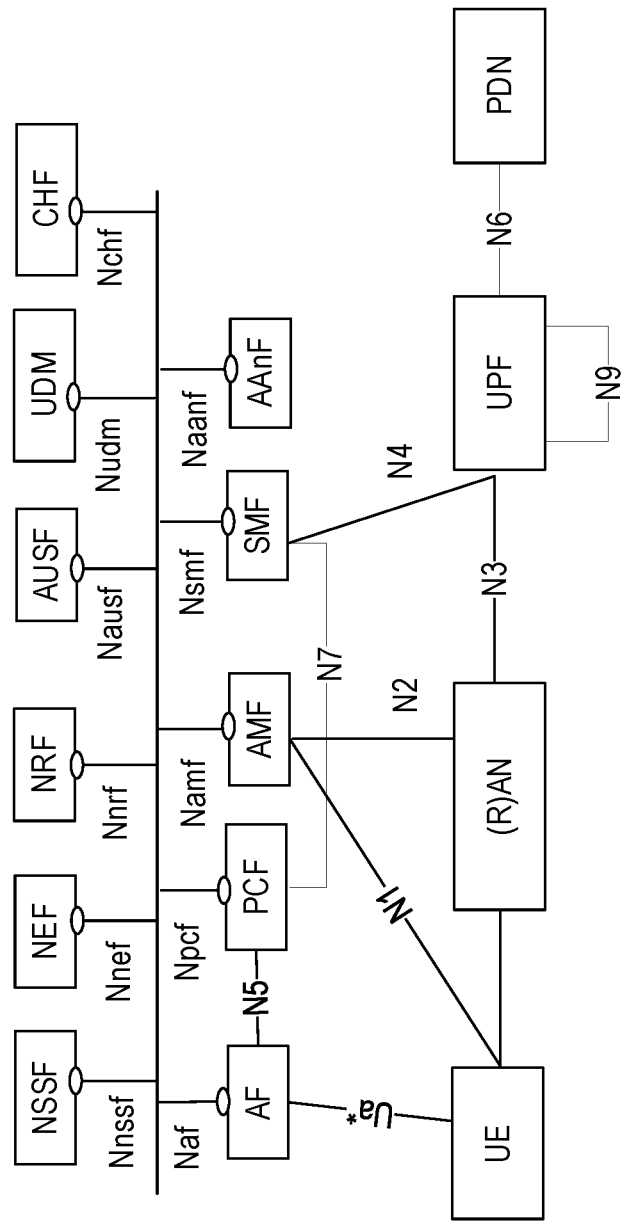
FIG. 2 shows an exemplary non-roaming 5G reference architecture with service-based interfaces and various network functions (NFs) in a core network, as further described in 3GPP TS 23.501 (v16.1.0).

As discussed above, services can be deployed as part of a network function (NF) in the 5G SBA. This SBA model, which further adopts principles like modularity, reusability and self-containment of NFs, can enable deployments to take advantage of the latest virtualization and software technologies. FIG. 2 shows an exemplary non-roaming 5G reference architecture with service-based interfaces and various 3GPP-defined NFs within the Control Plane (CP). These include the following NFs, with additional details provided for those most relevant to the present disclosure:

Application Function (AF, with Naf interface) interacts with the 5GC to provision information to the network operator and to subscribe to certain events happening in operator's network. An AF offers applications for which service is delivered in a different layer (i.e., transport layer) than the one in which the service has been requested (i.e. signaling layer), the control of flow resources according to what has been negotiated with the network. An AF communicates dynamic session information to PCF (via N5 interface), including description of media to be delivered by transport layer.

Policy Control Function (PCF, with Npcf interface) supports unified policy framework to govern the network behavior, via providing PCC rules (e.g., on the treatment of each service data flow that is under PCC control) to the SMF via the N7 reference point. Similar to LTE PCRF, PCF provides policy control decisions and flow based charging control, including service data flow detection, gating, QoS, and flow-based charging (except credit management) towards the SMF. The PCF receives session and media related information from the AF and informs the AF of traffic (or user) plane events.

User Plane Function (UPF) with Nupf interface—supports handling of user plane traffic based on the rules received from SMF, including packet inspection and different enforcement actions (e.g., event detection and reporting).

Session Management Function (SMF, with Nsmf interface) interacts with the decoupled traffic (or user) plane, including creating, updating, and removing Protocol Data Unit (PDU) sessions and managing session context with the User Plane Function (UPF), e.g., for event reporting. For example, SMF performs data flow detection (based on filter definitions included in PCC rules), online and offline charging interactions, and policy enforcement.

Charging Function (CHF, with Nchf interface) is responsible for converged online charging and offline charging functionalities. It provides quota management (for online charging), re-authorization triggers, rating conditions, etc. and is notified about usage reports from the SMF. Quota management involves granting a specific number of units (e.g. bytes, seconds) for a service. CHF also interacts with billing systems.

Access and Mobility Management Function (AMF, with Namf interface) terminates the RAN CP interface and handles all mobility and connection management of UEs (similar to MME in EPC).

Network Exposure Function (NEF) with Nnef interface—acts as the entry point into operator's network, by securely exposing to AFs the network capabilities and events provided by 3GPP NFs and by providing ways for the AF to securely provide information to 3GPP network.

Network Repository Function (NRF) with Nnrf interface—provides service registration and discovery, enabling NFs to identify appropriate services available from other NFs.

Network Slice Selection Function (NSSF) with Nnssf interface—a "network slice" is a logical partition of a 5G network that provides specific network capabilities and characteristics, e.g., in support of a particular service. A network slice instance is a set of NF instances and the required network resources (e.g. compute, storage, communication) that provide the capabilities and characteristics of the network slice. The NSSF enables other NFs (e.g., AMF) to identify a network slice instance that is appropriate for a UE's desired service.

Authentication Server Function (AUSF) with Nausf interface—based in a user's home network (HPLMN), it performs user authentication and computes security key materials for various purposes.

The Unified Data Management (UDM) function shown in FIG. 2 is similar to the HSS in LTE/EPC networks discussed above. UDM supports Generation of 3GPP authentication credentials, user identification handling, access authorization based on subscription data, and other subscriber-related functions. To provide this functionality, the UDM uses subscription data (including authentication data) stored in the 5GC unified data repository (UDR). In addition to the UDM, the UDR supports storage and retrieval of policy data by the PCF, as well as storage and retrieval of application data by NEF.

Figure 3:
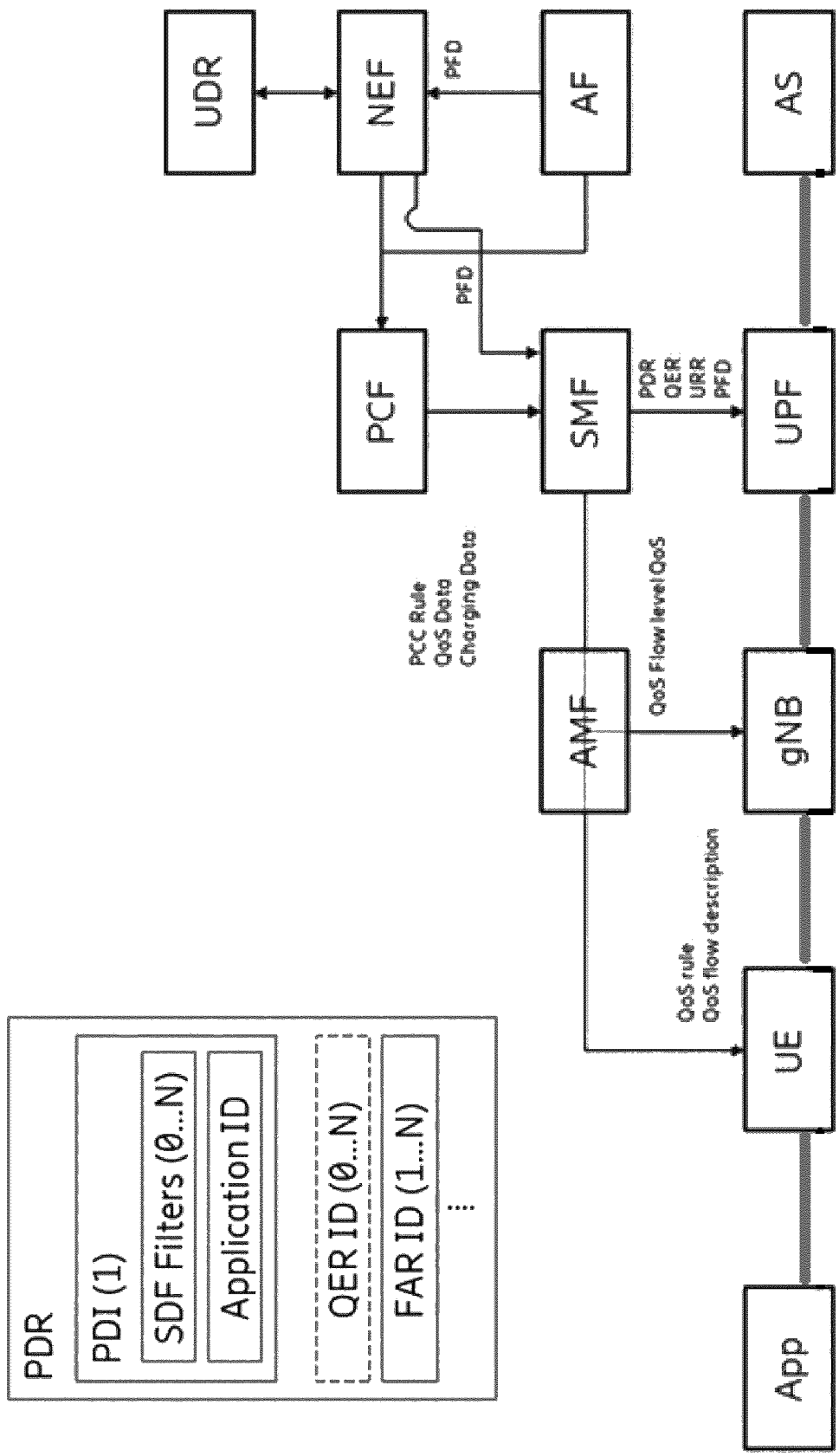
FIG. 3 illustrates the flow of various policy and charging control messages among functions and nodes in a 5G network.

FIG. 3 illustrates the flow of various messages, data, and parameters relevant to QoS and charging policy establishment and enforcement. Note that the detailed discussion that follows will use some of the message and parameter names shown in this figure, but these names should be interpreted broadly, as referring to messages, data structures, or parameters having similar purposes or functions, even if their names are different.

The parameter population into the UPF for traffic separation can be seen in FIG. 3. The top portion depicts the architecture and how the parameters get into the UPF. The bottom portion depicts the structure of a Packet Detection Rule (PDR), which is provided to the UPF.

The SMF create the Packet Detection Rule (PDR) based on the PCC Rule. The PCF is creating and managing PCC rules. The PDR contains either Service Data Flow Filters or a reference to a Packet Flow Description (PFD). The Service Data Flow Filters are same as Packet Filters (4G Term) and can either be IP Packet Filters or Ethernet Packet Filters. The IP Packet Filters describe an application flow (or service data flow) contain information around client and server IP addresses, protocol, Type of Service (or DiffServ Code Point), etc. (See 3GPP TS 23.501 Clause 5.7.6).

Packet Flow Descriptors are references by an Application Id. Multiple PDRs can refer to the same PFD. A PFD contains e.g. information like a domain Name (as resolved by DNS) or SNI.

Operational details of at least some of the foregoing functions are not directly germane to the methods and apparatuses contemplated herein for managing compromised communication devices, but generalized operations are detailed in 3GPP TS 23.501.

As briefly discussed above, for IMS, dedicated bearers/QoS flows are always identified using a 5-tuple. SIP signaling is used to provide the 5-tuple from the UE application (the SIP client) to the Policy Control Function (PCF). The Proxy Call Session Control Function (P-CSCF) parses the Session Description Protocol (SDP) object and triggers the according call using the Rx or N5 interface. In SIP, the user plane is always established via SIP signaling, i.e., out of band. The PCF gets the 5-tuple parameters before the first packet is send via the user-plane.

For HTTP-based traffic, on the other hand, the source TCP port only becomes known during the establishment of a TCP connection. Thus, an essential 5-tuple component (i.e., the source port) is only available to the PCF after establishing the TCP connection.

Another issue with the explicit signaling of 5-tuples as is done in SIP/IMS is the signaling load. In case of Dynamic Adaptive Streaming over HTTP (DASH) streaming, the DASH client opens a number of different HTTP connections and will continuously open connections, with a different source TCP port for every new connection. If the 5-tuples are explicitly signaled each time, the signaling load will grow substantially.

Further, for many automotive use cases, the application is located behind the UE on a different device. The UE contains a network address translator (NAT) to separate (and hide) the vehicle's internal network from the wide area network. The UE with the NAT routes data connections from different applications. With 5-tuple based signaling, there is a high signaling load.

The 5GMS Client (Media Session Handler) needs to currently first set up the TCP connection and then provide the 5-tuple of the new TCP connection to the 5GMS AF with the dynamic policy activation procedure (3GPP TS 26.501, Clause 5.7). Since many clients need a high number of TCP connections (e.g., a DASH Player typically opens a TCP connection for each adaptation set and multiple connections for representations), this procedure is quite slow and creates overhead. Further, the first bytes on the TCP connection are not treated according to the dynamic policy, since the 5-tuple has not yet been added.

Figure 4:
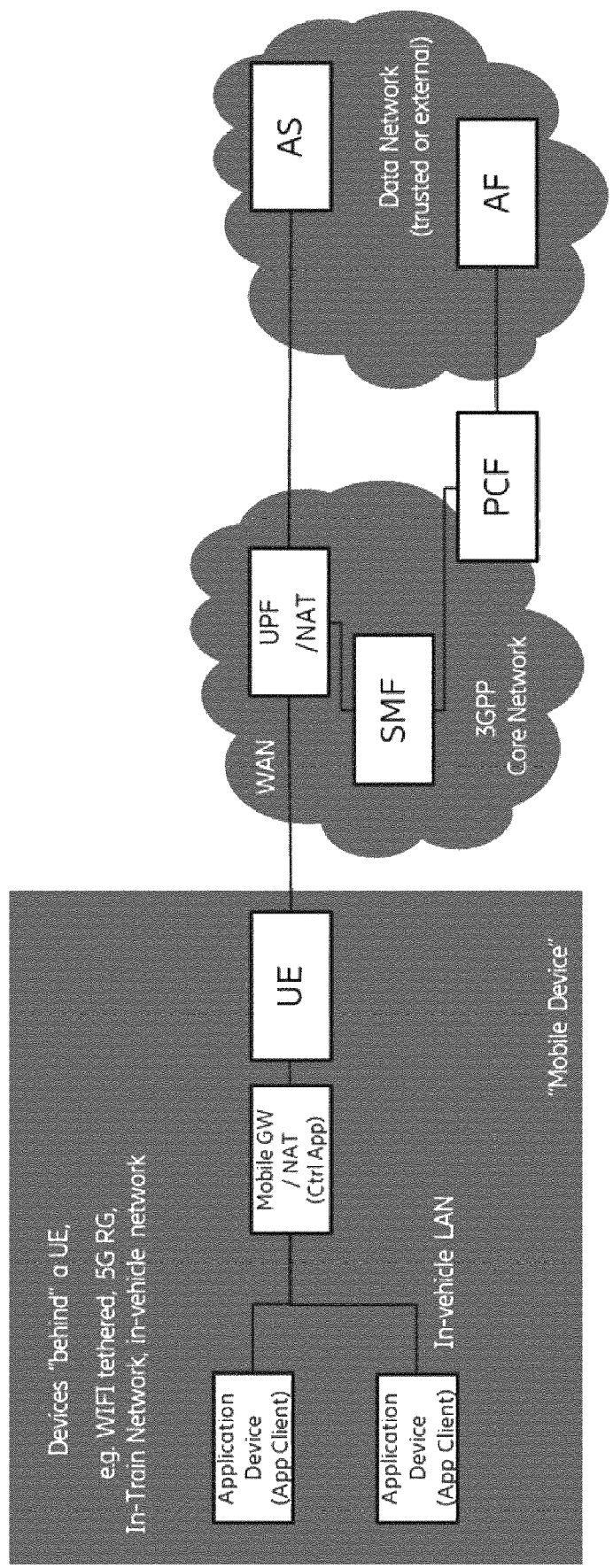
FIG. 4 is a simplified illustration of a 5G network architecture.

A simplified illustration of a network architecture for application of the presently disclosed techniques is depicted in FIG. 4. The "mobile device" shown here may be considered as a moving network containing multiple application devices, which may or may not be physically separate devices. The mobile device contains a special mobile gateway (GW) function, at least one UE (considered here a modem device providing services to the application devices) and one or more application devices for hosting application client functions. The application devices are connected to the mobile GW using normal ethernet (like the 5G-RG scenario or in-vehicle networks) or WiFi (smartphone tethering) or other technologies.

The mobile device, which might be a car or a train, for example, is connected to a cellular wide area network (WAN), via the UE. The cellular system provides basic connectivity to a data network, such as the Internet, via a UPF. The application devices inside the mobile device typically connect to an application server (AS), which can be deployed in a public cloud.

To interact with the cellular system for changing charging or QoS configuration of a packet data unit (PDU) session, an Application Function (AF) is deployed in an external or Trusted Data Network (TDN). The AF may implement a 5GMS AF (see 3GPP TS 26.501) or a Vehicle-to-Everything (V2X) Application Enable (VAE) Server (3GPP TS 23.286), for example.

When an application client in the device or the Mobile GW desires to activate charging separation or to activate a new QOS rule, the application client contacts the AF, which acts as a relay to the PCF (or network exposure function, NEF) for triggering the new PCC rule activation. The intention is to treat data flows between a device and the Application Server (AS) according to a specific charging and/or QoS policy.

A basic idea underlying various embodiments of the presently disclosed techniques is to use a type-of-service (ToS) field in uplink (UL) packets, in combination with the client IP or a server IP or server name indication (SNI), to trigger the binding of the 5-tuple of the connection to an existing Policy and Charging Control (PCC) rule, e.g., to a a policy for QoS or charging separation. An intention is to update the Packet Detection Rules (PDRs) in the UPF in such a way that the downlink traffic (typically not ToS-marked or not marked correctly) is handled according to the PCC rule. New AF signaling may be implemented to instruct the UPF to handle the downlink traffic with the same rule set as the uplink traffic, even when the ToS field is not set in the downlink packets.

One solution is to dynamically add a new Service Data Flow Filter containing the 5-Tuple of the connection (See 3GPP TS 23.503, Clause 6.3 for details) to the PDR, when a first UL packet containing the ToS marking is detected. Another solution is to instruct a NAT function (either in the UPF or separated on N6) to set the value of the Downlink ToS Field to the same value as in the Uplink packets. Note that a particular Packet Detection Rule (containing different enforcement or action rules)/PCC rule may expressly allow handling of uplink and downlink differently, even when the uplink and downlink packets are subject to the same PCC rule.

Note that the terms "ToS field" and "ToS value" as used herein should be understood broadly. This term is historically association with the second byte of the header in an IPv4 packet. In various embodiments of the presently disclosed techniques, "ToS field" or the corresponding "ToS value" may refer to a new field in a packet header, e.g., created using options fields/header extension, or to an existing field, such as the DSCP field in IPv4 or the Traffic Class field in IPv6. Several of the detailed examples described herein and illustrated in the figures use the DSCP field and DSCP values for various purposes—it should be understood that the described techniques may be implemented using other ToS fields/values in a similar manner.

A benefit of the procedures described herein is to match newly created TCP connections (used by HTTPS transactions) with existing Packet Detection Rules, without having to add the exact 5-tuples to these rules when they are created. Further, it is not necessary to provide the 5-Tuples for service data flows explicitly for each new TCP connection.

One prime use case is flow-based charging separation, where a dedicated bearer/QoS flow is not needed (no actions on the UE side). Here, the 5-tuple of the newly created TCP connection should be quickly added as a new SDF Filter to the PDR in the UPF, after the connection is established, so that in particular the downlink traffic is treated/counted accordingly in the UPF. However, there are also use cases to use the concept for QoS flows, in particular when many and frequently changing TCP connections are used (like for DASH streaming).

The client IP or server IP/SNI may be used as a means to authorize the binding to an existing PCC rule. The application client sets the ToS field at TCP connection setup (typically) to a certain value. The current specifications do not describe a dynamic binding of connection 5-tuple to the existing PDR in the UPF. The value of the ToS field to be used to link a newly established connection to an existing rule is negotiated with the network.

The PCC rule (and corresponding PDRs in the UPF and QoS rules in the UE) is activated during a preparation step, which happens before the first usage. During activation, the ToS value is provided or assigned (negotiated) to identify those subsequently arising connections that should be bound to the PCC rule. The client IP address (UE IP) can be used to scope the ToS values to specific clients. Alternatively (or in addition), the server IP address can be used to scope the ToS values so that an application service provider can use the same ToS values for its service. The latter concept is specifically beneficial to limit the usage of the PCC rules for some limited servers (e.g., only the servers of the application service provider).

A key aspect of some embodiments of this approach is "reflective" behavior, where the UPF treats the downlink packets for a given flow according to the same rule as the uplink packet, even when the TOS field is different in downlink direction. This is useful because routers/gateways in different autonomous domains may re-write the ToS value according to their own policies, so it is not guaranteed that the ToS value in the downlink is identical to that in the uplink. New signaling may be needed to add a "reflective" indicator for downlink traffic treatment into the PCC Rule, so that the Session Management Function (SMF) can inform the UPF accordingly.

There are several different realizations to enable this "reflective" behavior:

A NAT in the mobile network operator (MNO) network (UPF SF or separated on the N6 interface) may be configured to rewrite the ToS field of the downlink packets (to the UE) according to the uplink value (from the UE). This can be seen as a "reflective ToS". A NAT needs to in any case maintain a context between the external IP address & ports to internal IP addresses & ports. Beside re-writing the destination IP and port fields in the packets (as normal NAT operation), the NAT can also re-write the ToS field value according to the uplink TOS field. In this case, 5-tuples of new TCP connections do not need to be added to the packet detection rules of a PCC rule, but instead that packet detection rule can use a ToS filter to match packets based on the ToS value.

When there is no NAT, the UPF may update the Packet Detection Rules (PDRs) and add a new SDF filter for a 5-tuple derived from the first marked uplink packet.

An alternative implementation can use options fields (IPv4) (header extension) to provide the binding descriptor.

For IPv4, the Diff Serv Code Point (DSCP) field in the IP header may be used as ToS. For IPv6, the Traffic Class field in the IP header may be used as ToS. Alternatively, the header may be extended to create a new field to be used as the ToS field for the purposes of implementing these techniques.

Figure 5:
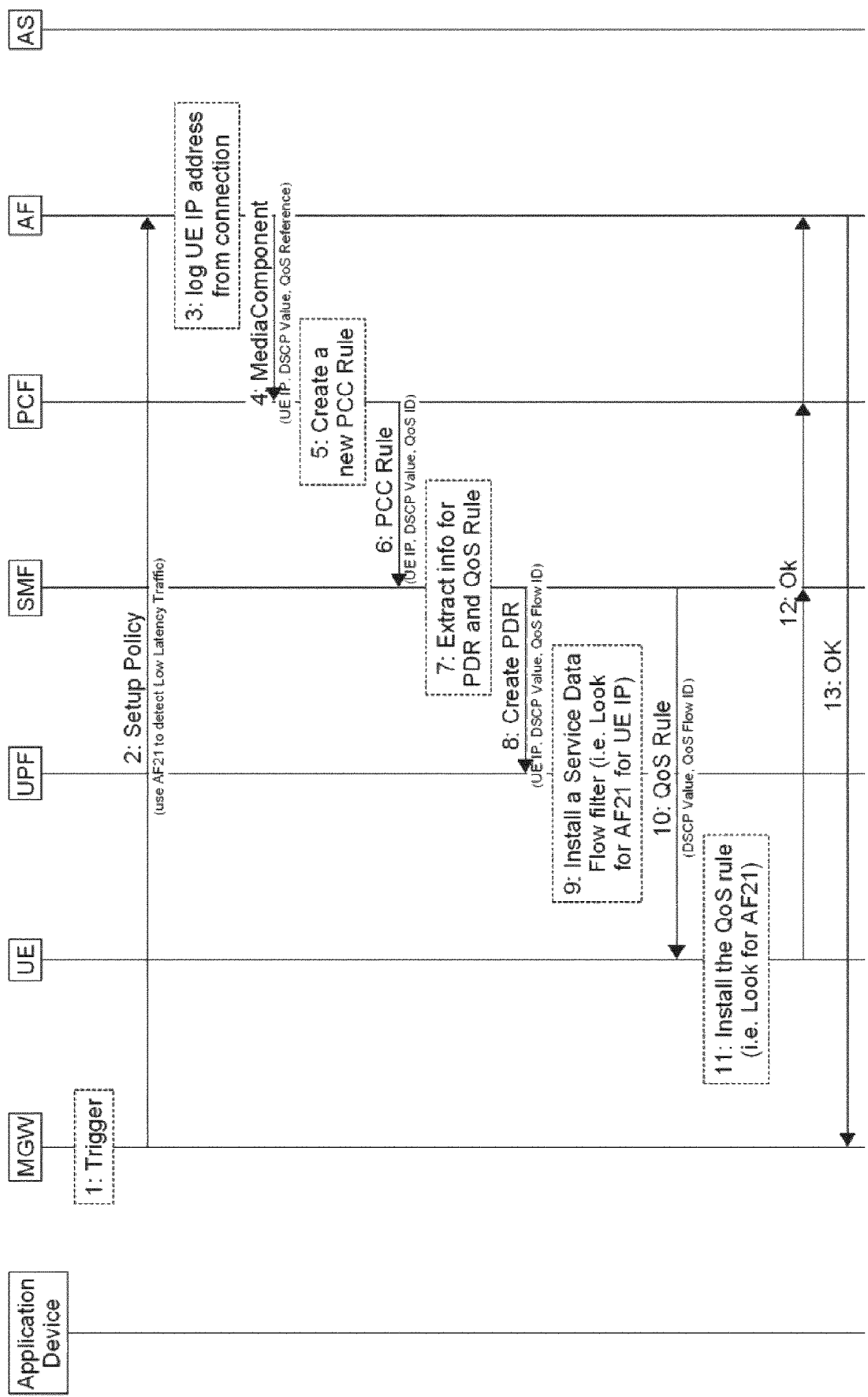
FIG. 5 is a signaling flow illustrating the setting up of a new Packet Detection Rule (PDR).

An example signaling flow for establishing a new PCC rule in a UPF without any 5-tuple is shown in FIG. 5. This signaling flow comprises what might be referred to as "Phase 1," in which a Mobile GW in or associated with a wireless device (UE) is triggering the policy creation in the 5G Syste, (at least in the UPF) without any 5-tuple, but with a PDR (in the UPF) and a QoS rule (in the UE) that contains a type-of-service (ToS) value that can be detected when a subsequent data flow of packets containing this ToS value first arrives at the UPF. In this example, the ToS value is a Differentiated Services Code Point (DSCP) value, in this example. During a Phase 2 (described in detail below), one or more devices can establish service data flows and trigger an update of the PDRs within the UPF or associate more service data flows with the respective rule.

The steps shown in FIG. 5 are described below:
1: The Mobile GW (MGW) is triggered to establish the policy for QoS and/or charging. The trigger may be the start-up of the MGW, for example.
2: The MWG sends a Setup Policy Request Message, containing the ToS value (here AF21) and a behavior description. The behavior description is "Low Latency Traffic" in this example, which is a QoS behavior description. It can also be a charging description, e.g., OEM bucket, or vehicle owner bucket, or no-metering.
3: The AF logs the IP of the UE. The AF gets the IP address from the source address field of the connection.
4: The AF The AF sends a MediaComponent (within a Npcf Service Authorization request message) to the PCF, containing the UE IP address, the DSCP value (or TOS value) and a QoS/charging description (e.g., QoS reference that references a predefined QoS configuration). The QoS/charging description is used by the PCF to determine the QoS profile, in the event of QoS, or the different charging features (e.g., with/without metering).
5: The PCF creates the new Dynamic PCC rule.
6: The PCF sends this PCC rule to the SMF, and may include QoS/charging data descriptions if needed.

7. The SMF extracts information to be sent to UPF and UE.
8. The SMF creates a Packet Detection Rule (PDR) in the UPF using a PFCP Session establishment or modification procedure. The SMF may also create or update QoS Enforcement rules (QERs) or Usage Reporting rules (URRs) for charging.
9: The UPF installs a Service Data Flow (SDF) filter that is described in the PDR. The SDF Filter contains just the DSCP/TOS filed and the UE IP address.
10: In case of a QoS related PCC rule, the SMF sends a QoS rule (based on the PCC rule) via the AMF to the UE.
11: The UE installs the packet filter from the QoS rule. The Packet Filter contains just the DSCP/TOS field.
12: The acknowledgments corresponding to messages 10, 6 and 4 are transmitted from the UE, the SMF and the PCF respectively.
13: The acknowledgment corresponding to message2 is transmitted from the AF to the MGW.

Figure 6A:
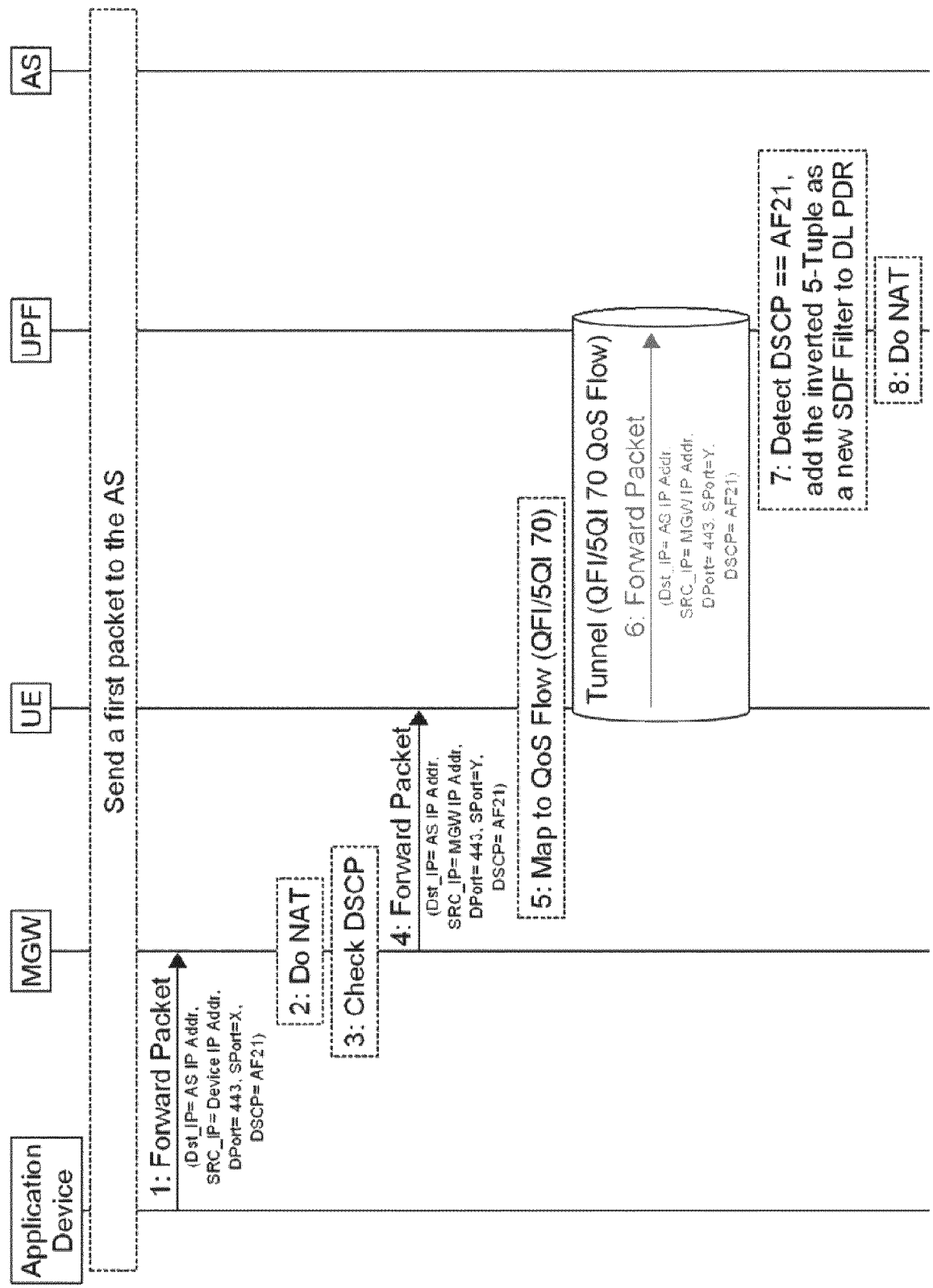
FIGS. 6A and 6B show a signaling flow illustrating the adding of a 5-tuple (PDR) to the PCC rule.
Figure 6B:
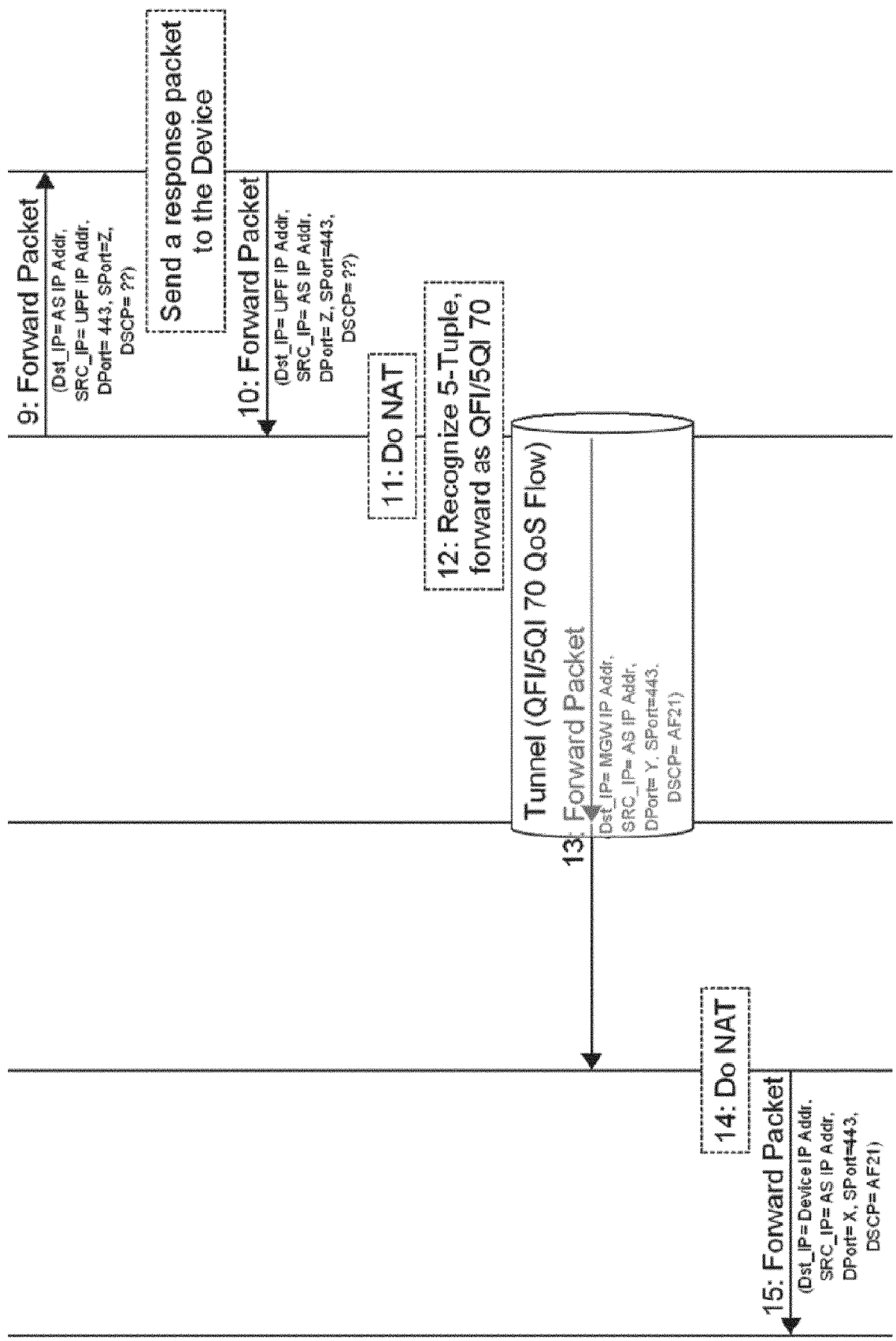

FIGS. 6A and 6B illustrates a signaling flow for binding an existing PDR in the UPF to a new connection. This is an example of "phase 2." Note that here, it is assumed that the signaling flow illustrated in FIG. 5 has already been carried out, so that there is a PDR in the UPF associated with at ToS value and, optionally, a source IP address corresponding to a wireless device and/or a destination IP address corresponding to an application server.

In the example shown in FIGS. 6A and 6B, an existing Packet Detection Rule in the UPF, which may have been established according to the procedure shown in FIG. 5, is bound to a new connection/data flow, so that the associated QoS policy and/or charging policy can be applied to the data flow. This may involve adding an SDF filter to the downlink PDR, based on the ToS value in the UL packet, which can be used to ensure that the downlink traffic for that connection/data flow can be treated according to the PCC rule. In an alternative realization, an additional service data flow is associated with an existing PCC rule. Note that the Application Server (AS) may be a CDN node, which is supposed to be as "dumb" as possible.

Details of the steps shown in FIGS. 6A and 6B are discussed below. Steps 1 through 9 are carried out when a first packet of a TCP connection is sent through the UPF. This may be, for example, a TCP SYN packet for establishing a TCP connection:

1: An application client in the device behind the Mobile Gateway (MGW) decides to establish a TCP connection for requesting content, e.g., using HTTPS. It is assumed here that the application client has already resolved the fully qualified domain name (FQDN) of the application server to a Destination Address (Dst_IP). The application client is now sending a first TCP SYN packet to the AS to establish the TCP connection. In some embodiments, the application client sets the DSCP value in this first packet to an earlier-agreed value (in this example, AF21).
2: The MGW creates a NAT context to hide the Device IP address corresponding to the application client behind its own IP. The NAT in the MGW replaces the Source IP address with its own external IP address and creates a new TCP source port for the new connection (SPort).
3: In some embodiments, the MGW may be responsible for setting the ToS value to associate the new connection to a particular QoS policy or charging policy, rather than the application client. In these embodiments, the MGW sets the DSCP to AF21, in this example. The MGW has negotiated the DSCP value with the AF in Phase 1 (an example of which was illustrated in FIG. 2) for marking the traffic. In some embodiments, the MGW may implement a (dynamic) mapping of DSCP values indicated by application devices to DSCP values used to map uplink data to different QoS flows. In this manner, the MGW can use its broader knowledge of device and network conditions to appropriately map data flows to QoS flows.
4: The MGW writes the packet to the UE interface. The Source IP field of the packet is now the external IP of the MGW and the Source Port field is now the new Source Port on the NAT. The NAT function keeps the forwarding context to handle the response (i.e., to replace the Destination Address and Destination Port with correct values for the target, in response packets).
5: In the event of QoS-based flow mapping, the UE maps the IP packet according to the packet filters in the QoS rules associated with the DSCP value. In this example, the packet is mapped to the QoS flow with QFI/5QI 70.
6: The UE forwards the IP packet via the QFI/5QI 70 tunnel (QoS flow) to the UPF.
7: The UL PDR in the UPF detects the UL packet with the DSCP field and adds the 5-tuple of the new connection to the PCC Rule. Note that this 5-tuple is inverted as part of adding a new SDF filter to the downlink (DL) PDR.
8: The UPF applies NAT and re-writes the Source IP and Source Port.
9: The UPF forwards the packet to the application server (AS) in the external Data Network (e.g., CDN). The DSCP might be rewritten to 0x00, for example. Note that in this illustrated example, the UE, MGW, and application device are pictured as separate functional units. In practice, these may correspond to separate physical devices. This may be the case in an automotive application, where an MGW is built into the automobile and serves one or several application devices in the vehicle, some of which may be personal devices that attach to the MGW when their users are in the vehicle. In other implementations or instances, two or all three of the UE, MGW, and application device may be implemented in a single device, e.g., in a smartphone.

Figure 7A:
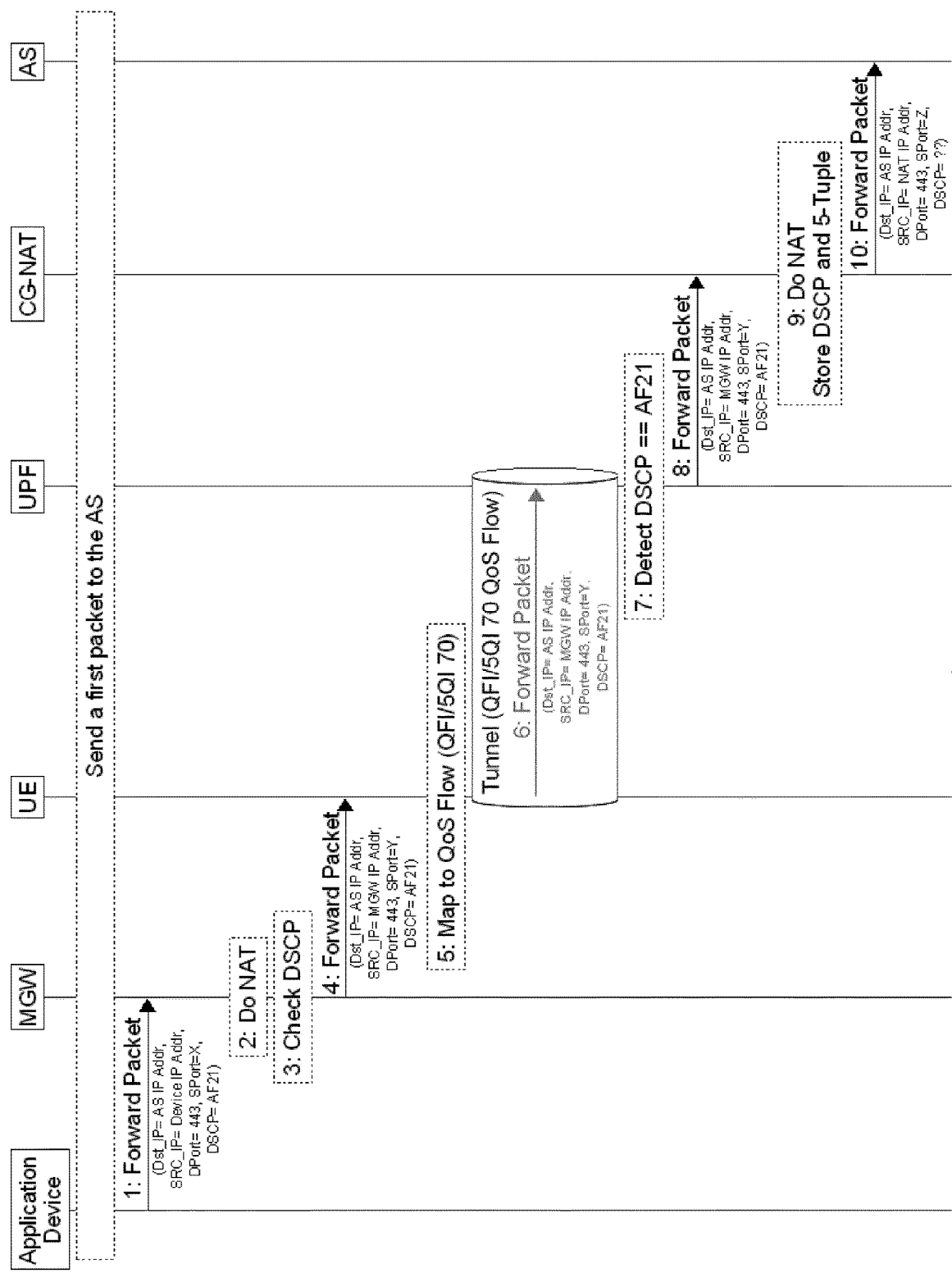
FIGS. 7A and 7B show a signaling flow illustrating an optimized approach using a separate UPF and NAT.
Figure 7B:
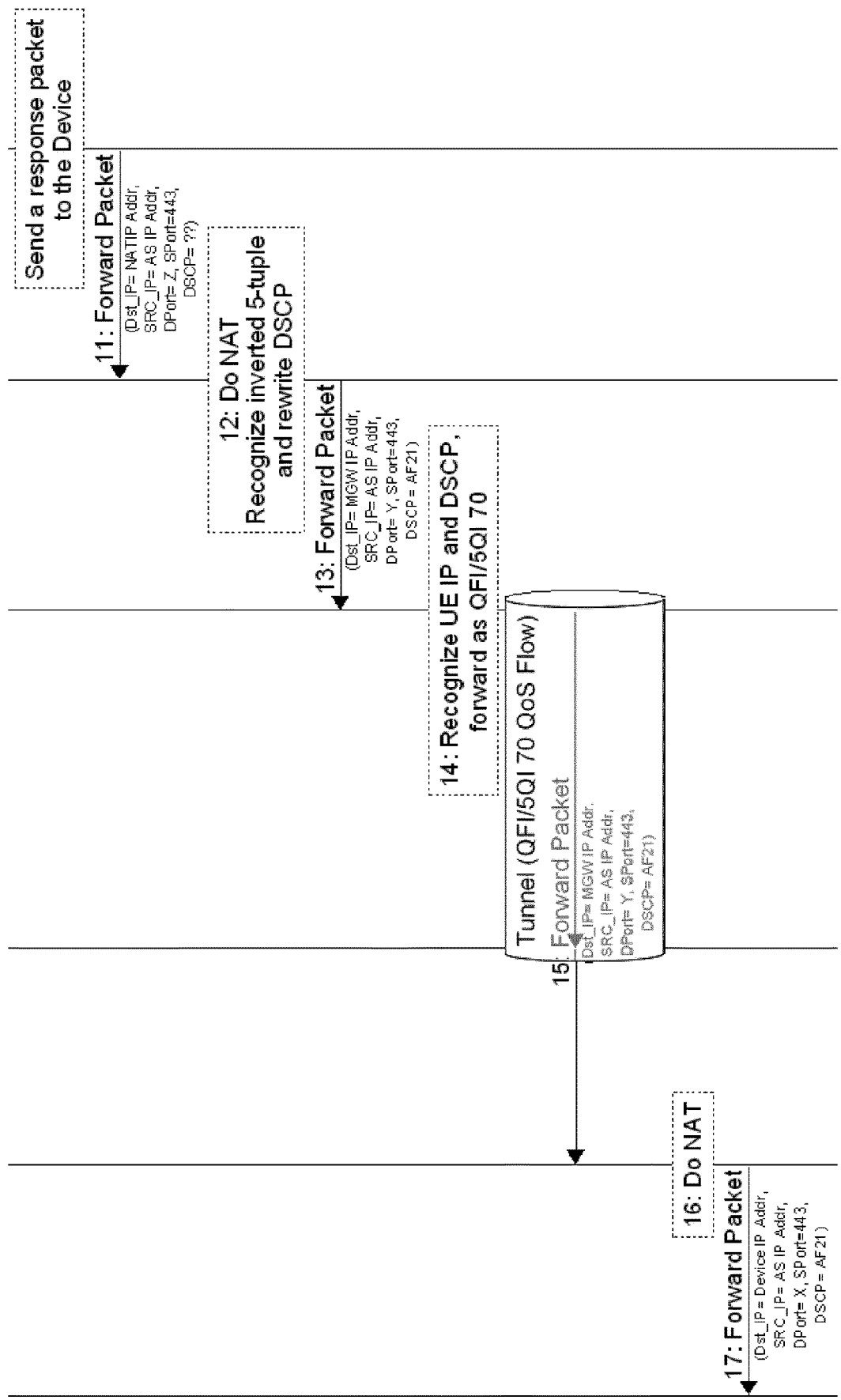

Steps 10 through 14 of the process shown in FIGS. 7A and 7B apply when a response packet is sent back towards the application device:

10: The AS generates a response IP packet for the connection. The Destination IP is the public UPF IP address for the UE and the Destination Port is the port allocated by the UPF NAT.
11: The UPF applies the NAT and changes the destination header fields.
12: The UPF recognizes the DL packet using the SDF filter added to the DL PDR in step 7. This amounts to matching the 5-tuple of the DL packet to that stored in the SDF filter. In case of charging, the traffic is marked accordingly in the CDR. In case of QoS, the UPF looks up the matching QoS flow for the service data flow and assigns the corresponding QFI/5QI to the packet (with QFI/5QI70 here).
13: The UPF forwards the packet via the UE to the MGW.
14: The MGW applies the NAT and rewrites the destination fields.
15: Traffic is transmitted from the MGW to the device.

Another solution, which might be regarded as more optimized, is illustrated in FIGS. 7A and 7B. In this example, the UPF and a network address translation (NAT)

function, here shown as a carrier-grade NAT (CG-NAT), are deployed as separate functional units, which may be implemented in physically separated devices. In this solution, the CG-NAT re-writes the DSCP field in downlink traffic with the DSCP value of the uplink traffic corresponding to that connection.

In this signaling flow, steps 1 to 7 are identical to those in FIGS. 6A and 6B, except that in step 7, the UPF does not need to capture a new 5-tuple in the PDR. The UPF leaves the DSCP value in. The remaining steps are detailed here:

Step 8: The UPF forwards the packet to the CG-NAT.
Step 9: The CG-NAT applies NAT function and rewrites the source IP address and source port. The CG-NAT also stores the DSCP and 5-tuple of the uplink packet.
Step 10: The CG-NAT forwards the IP packet to the AS. The DSCP value may be the same or different.

In this flow, the following steps apply to a reply message:

Step 11: The AS generates the response packet. The Destination IP address is the public IP address of the NAT. The Destination Port is the port allocated by the NAT.
Step 12: The NAT receives the packet and rewrites the destination fields. The NAT also recognizes the inverted 5-tuple saved in step 9 and rewrites the DSCP value to the earlier stored value.
Step 13: The NAT forwards the packet.
Step 14: UPF recognizes the UE IP address and the DSCP. In case of charging, the traffic is marked accordingly in the CDR. In case of QoS, the UPF looks up the matching QoS flow for the service data flow (with QFI/5QI70 here).

The remaining steps are identical to the according steps in FIGS. 6A and 6B.

Figure 8:
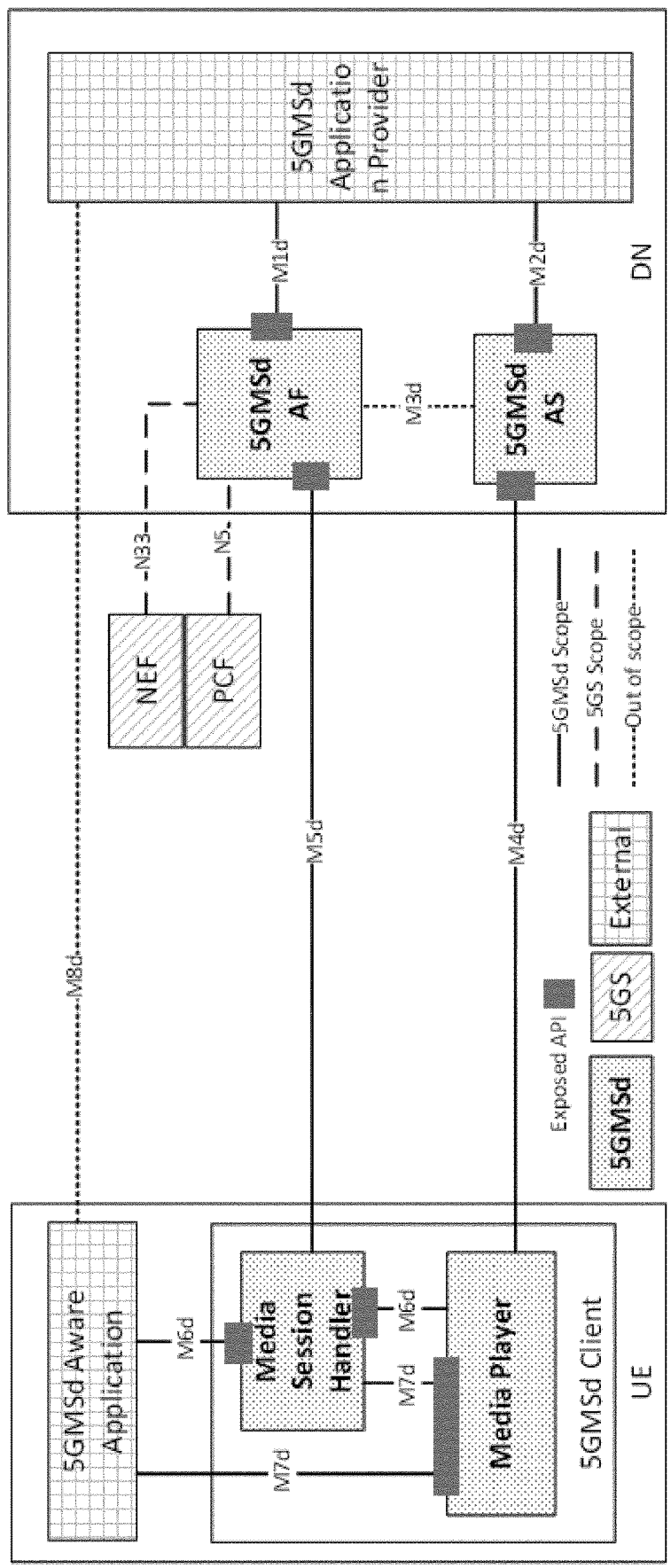
FIG. 8 illustrates a SGMS architecture for downlink streaming.

An example realization with the 5G Media Streaming Architecture for downlink (5GMSd) is depicted in FIG. 8. Details of the 5G Media Streaming Architecture may be found in 3GPP TS 26.501. Note that the same mechanism can be applied to the uplink streaming architecture (5GMSu). Also, the 5GMSd AF may be deployed in a Trusted Data Network (DN) or an external DN. The 5GMSd AF may interact directly with the PCF, when deployed in a trusted DN.

Figure 9A:
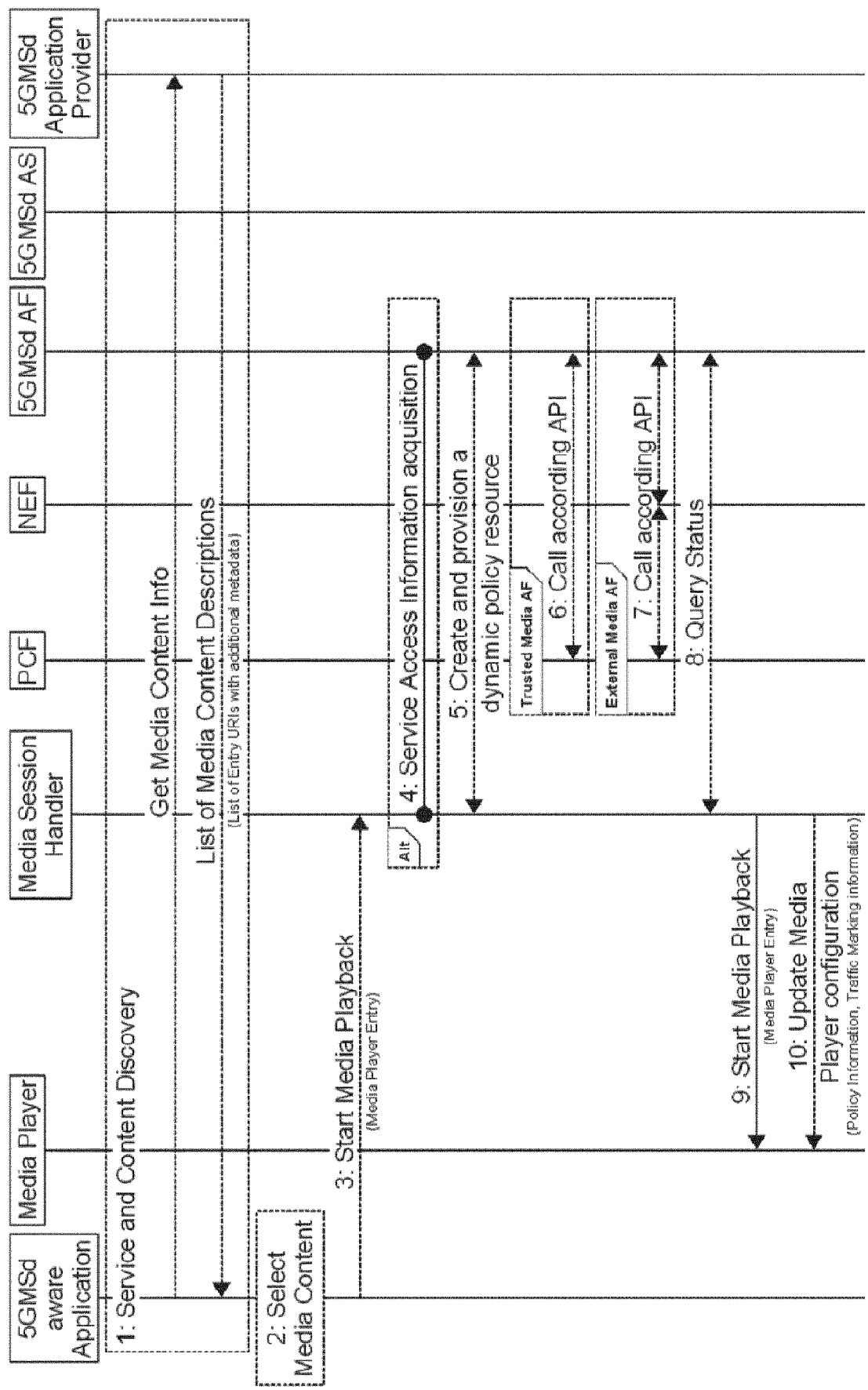
FIGS. 9A and 9B illustrate an improved call flow for DASH streaming.
Figure 9B:
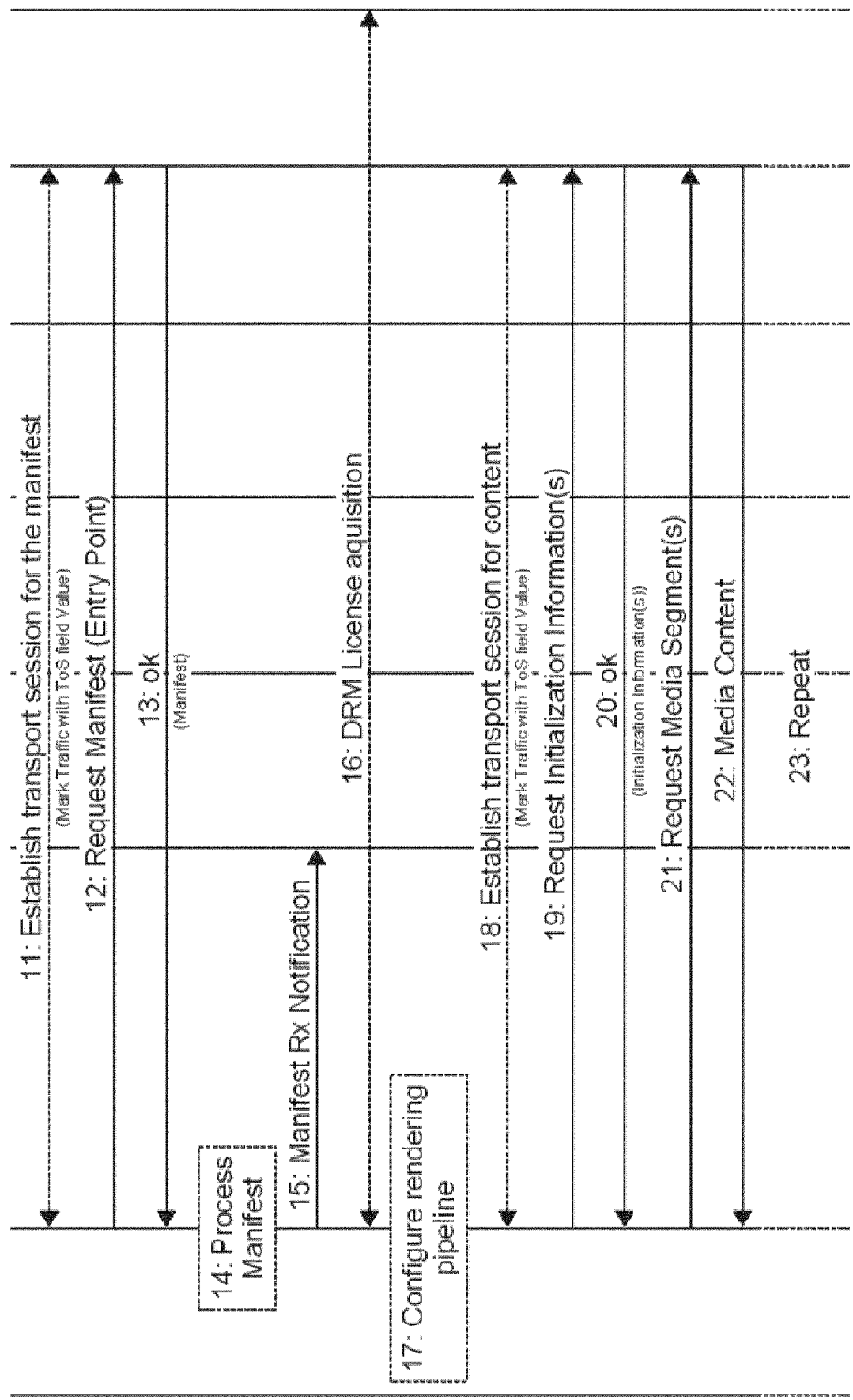

FIGS. 9A and 9B illustrates an example signal flow for DASH Streaming. The procedure may be applied to other services, such as software download, as well. The description of the flow illustrated in FIGS. 9A and 9B follows that provided in 3GPP TS 26.501, clause 5.7.4. A key difference is that the Dynamic Policy Invocation and Activation happens much earlier in the sequence (Step 5 above). In step 5, the Media Session Handler within the 5GMSd Client provides the description of the Dynamic Policy to the 5GMSd AF (in form of a Policy Template Id) to activate the dynamic policy. The 5GMSd AF interacts either with the PCF (step 6) or the NEF (step 7), depending on the deployment of the 5GMSd AF in the trusted or the external DN.

The Media Session Handler may get the ToS field value for the flow marking either in step 6 or step 8. When the Media Player (the application client function, which triggers the establishment of new TCP connections) can mark the flow, then the Media Session Handler passes the ToS value to the Media Player. There may be other means for the 5GMSd Client to ensure that the TCP traffic is marked according to the agreed value.

Many over-the-top (OTT) application services use many TCP connections, simultaneously and sequentially. A single OTT application service is typically connected to multiple Application Servers (ASes), which are typically deployed as CDN edge nodes. A benefit of various embodiments of the above described solutions is to introduce a faster means for an application client to add new Service Data Flows into an existing PCC rule without explicit signaling. Conventionally, the peers provide explicitly the ports to the PCF. The techniques described herein provide the 5-tuple implicitly, with the TCP session setup.

Figure 10:
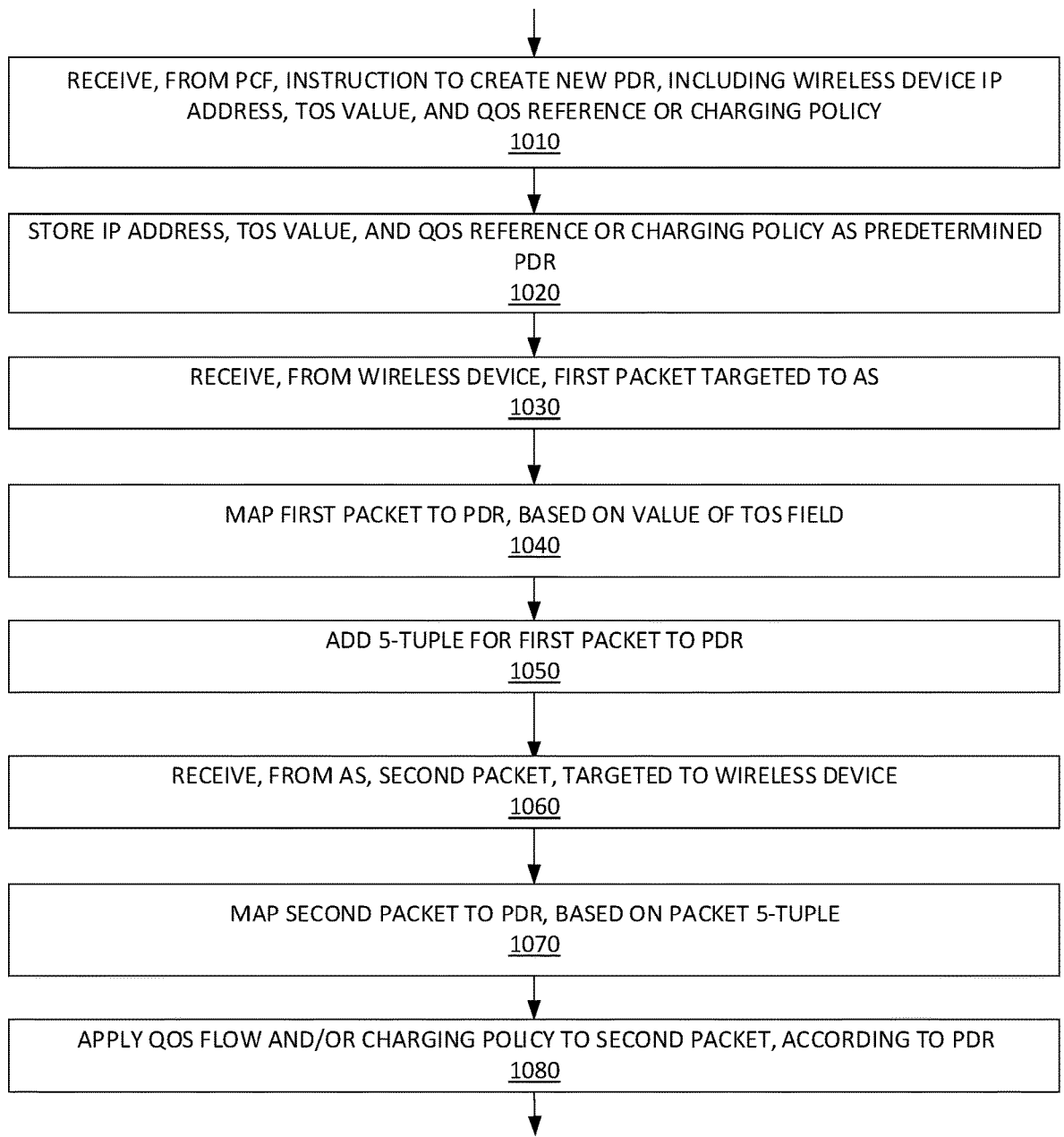
FIG. 10 is a process flow diagram illustrating an example method in a UPF.

In view of the detailed examples and description provided above, it will be appreciated that FIG. 10 is a process flow illustrating an example method for carrying out some of the techniques, as might be implemented in one or more network nodes acting as a User Plane Function (UPF). This method begins with a process of setting up a PDR in the UPF, to which one or more subsequent connections can be associated, or "bound." As shown at block 1010, the method includes the step of receiving, from a PCF, an instruction to create a new PDR, the instruction comprising an IP address for the wireless device, the value of the ToS field, and a quality-of-service (QoS) reference or charging policy, i.e., some value or parameter that ties the PDR to a particular QoS policy or flow or to a particular charging rule or category.

The method continues, as shown at block 1020, with storing the IP address, the value of the ToS field, and the QoS reference or charging policy as a predetermined PDR. Note that at this point, the predetermined PDR is not associated with, or bound, to any particular data flow or TCP connection. Note that blocks 1010 and 1020 correspond to steps 6 and 7 in FIG. 5.

As shown at block 1030, the method comprises receiving, from a wireless device, a first packet targeted to an application server (AS). This may be the first packet of a newly established TCP connection, e.g., a TCP SYN packet. This triggers the binding of the connection to the predetermined PDR. More particularly, the method comprises, as shown at block 1040, the step of mapping the first packet to the predetermined PDR, based on a value of a ToS, field in the first packet. The method further comprises adding a 5-tuple associated with the first packet to the predetermined PDR, as shown at block 1050. This serves to bind the new connection to the PDR. Note that this may comprise adding a new Service Data Flow Filter (SDF) to the PDR, which may comprise several SDFs, with the new SDF comprising the 5-tuple associated with the first packet. Blocks 1030-1050 correspond to steps 6 and 7 of FIGS. 6A and 6B.

In some embodiments, the mapping of the first packet to the predetermined PDR as shown in block 1040 is further based on one or both of a source IP address and destination IP address of the first packet. This way, the same ToS value may map to different PDRs, for different clients or application servers. This source IP address of the first packet may be an IP address for a mobile gateway associated with the wireless device, in some embodiments.

The ToS field in the first packet may be any of a variety of header fields, including any of the following, in various embodiments: an optional header field in the first packet; a differentiated services code point, DSCP, field in the first packet; and a traffic class field in the first packet.

Blocks 1060-1080 illustrate the handling of a response packet from the AS to the wireless device, in some embodiments. As shown at block 1060, the method may further comprise the step of receiving a second packet, from the AS. As seen at block 1070, the second packet is mapped to the predetermined PDR by matching the 5-tuple of the second packet to the 5-tuple in the predetermined PDR. Finally, as seen at block 1080, a QoS flow and/or a charging policy is applied to handling of the second packet, according to the predetermined PDR. Blocks 1060-1080 correspond to steps 10-13 of FIGS. 6A and 6B.

Figure 11:
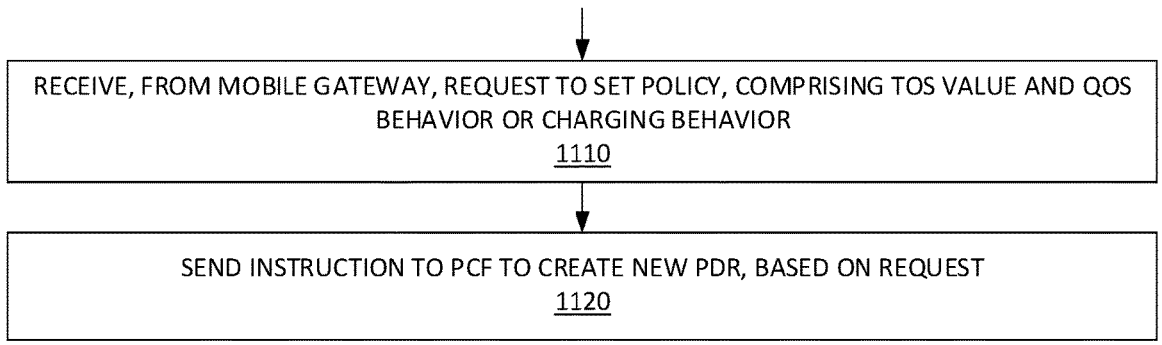
FIG. 11 is a process flow diagram illustrating an example method in an AF.

Complementary methods to that shown in FIG. 10 may be implemented in several other functional nodes. For instance, FIG. 11 illustrates an example method carried out in one or more network nodes acting as an application function (AF). As shown at block 1110, this method comprises receiving, from a mobile gateway associated with a wireless device, a request to set up a policy, the request comprising a type-of-service, ToS value, and a quality-of-service (QoS) behavior and/or charging behavior to associate with the ToS value. The method further comprises, as shown at block 1120, sending to a policy control function, in response to the request, an instruction to create a new packet detection rule, PDR, the instruction comprising an IP address for the wireless device, the ToS value, and a QoS reference or charging policy reference. Blocks 1110 and 1120 correspond to steps 2-4 of FIG. 5.

Figure 12:
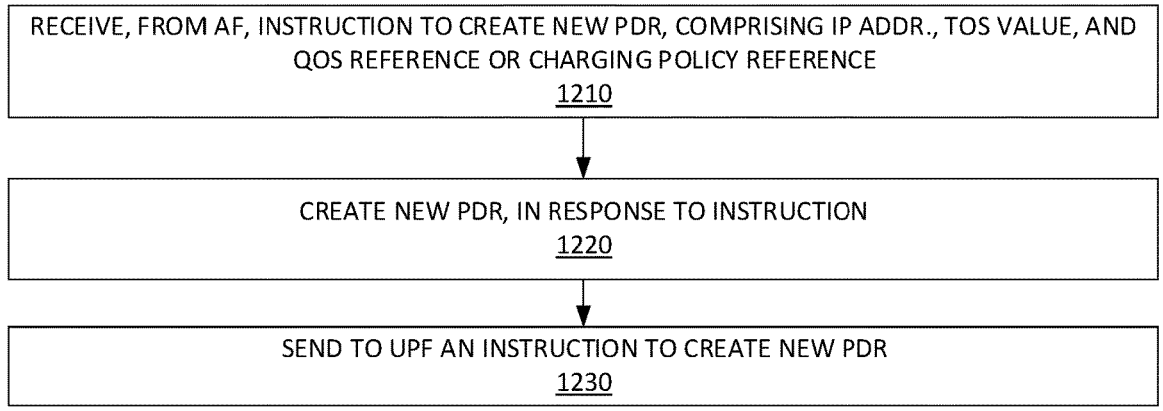
FIG. 12 is a process flow diagram illustrating an example method in a PCF.

FIG. 12 illustrates an example method as might be implemented in one or or more network nodes acting as a policy control function (PCF). This method comprises, as shown at block 1210, the step of receiving, from an application function, AF, an instruction to create a new packet detection rule, PDR, the instruction comprising an IP address for a wireless device, a type-of-service, ToS, value, and a quality-of-service (QoS) reference or charging policy reference. The method further comprises, as shown at block 1220, the step of creating a new packet detection rule, PDR, in response to the instruction, the new PDR comprising the IP address for the wireless device, the ToS value, and the QoS reference or charging policy reference. The method further comprises the step of sending, to a user plane function, UPF, an instruction to create a new packet detection rule, PDR. This is shown at block 1230. This instruction comprises the IP address for the wireless device, the ToS value, and the QoS reference or charging policy reference. Blocks 1210-1230 correspond to steps 4-6 of FIG. 5.

Figure 13:
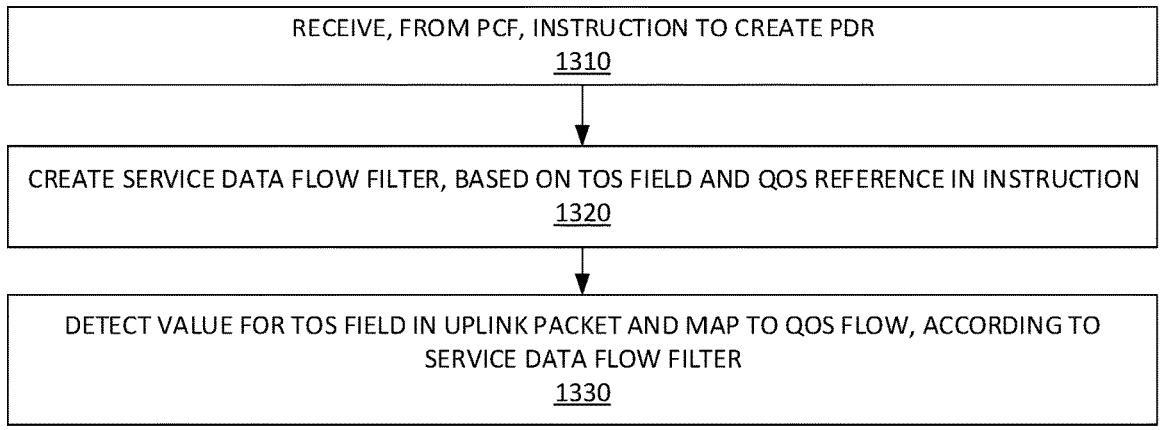
FIG. 13 is a process flow diagram illustrating an example method in a wireless device.

FIG. 13 illustrates an example method in a wireless device. This method comprises, as shown at block 1310, the step of receiving, from a policy control function, PCF, an instruction to create a packet detection rule, PDR, the request comprising an IP address for the wireless device, a value for a type-of-service, ToS, field, and a quality-of-service (QoS) reference. As shown at blocks 1320 and 1330, respectively, the method further comprises creating a service data flow filter, based on the ToS field and the QoS reference, and subsequently detecting the value for the ToS field in one or more uplink packets and mapping the one or more uplink packets to a QoS flow, according to the service data flow filter. Blocks 1310-1330 correspond to steps 8 and 9 of FIG. 5 and step 3 of FIGS. 6A and 6B.

Note again that the ToS field may be any one of the following, in various embodiments: an optional header field in each of the one or more uplink packets; a differentiated services code point, DSCP, field in each of the one or more uplink packets; and a traffic class field in each of the one or more uplink packets. In any of the embodiments described above, the IP address for the wireless device may be an IP address for a mobile gateway associated with the wireless device.

Figure 14:
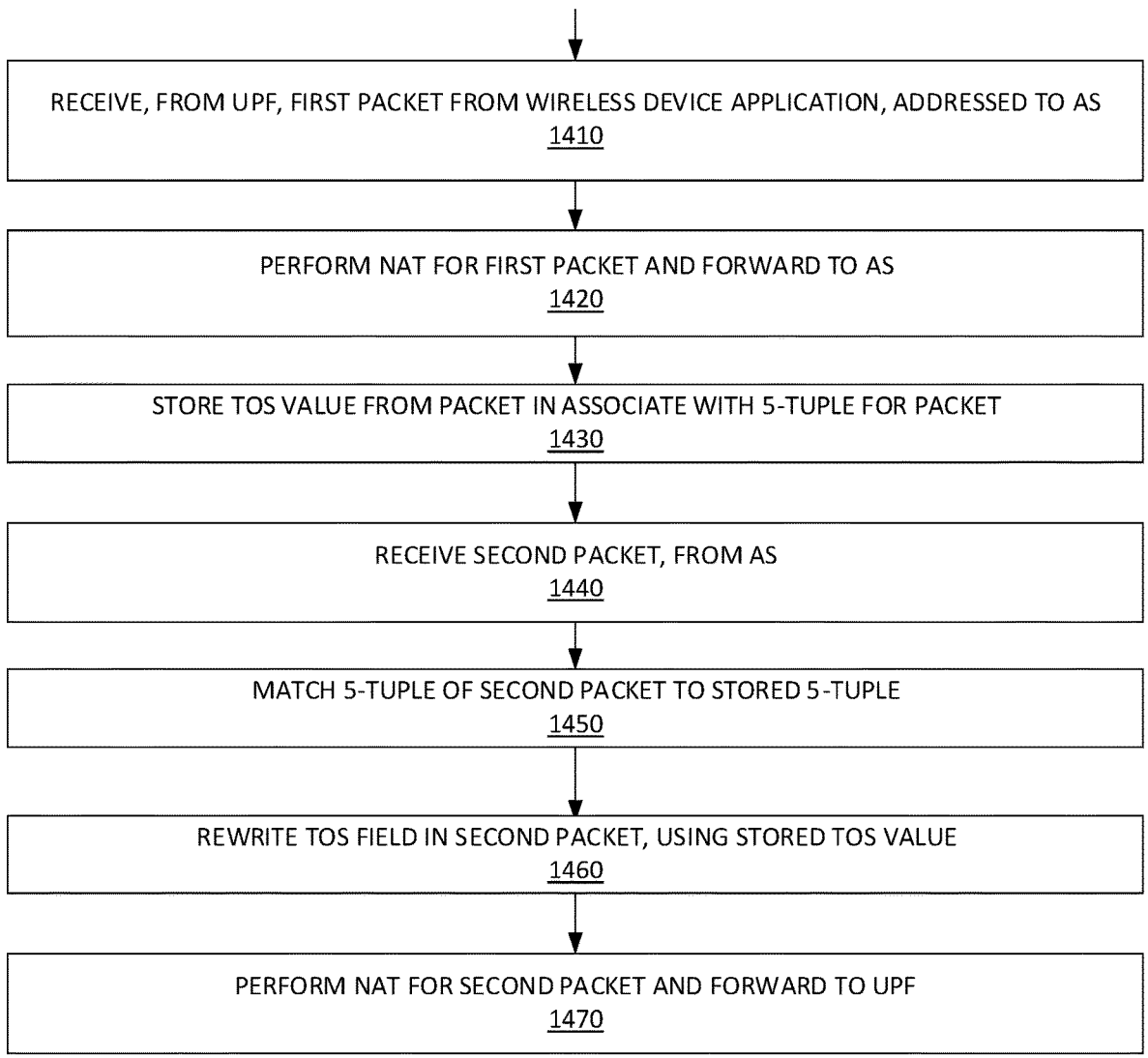
FIG. 14 is a process flow diagram illustrating an example method in a NAT.

FIG. 14 illustrates an example method in one or more nodes operating network address translation, NAT, in a network. This method presents an alternative approach to the steps shown in blocks 1030 to 1080 of FIG. 10. As shown at block 1410, the method comprises receiving, from a user plane function, UPF, a first packet originating from an application associated with a wireless device, the first packet being addressed to an application server. As shown at block 1420, the method comprises performing NAT for the first packet and forwarding the first packet to the application server. As shown at block 1430, a type-of-service, ToS, value from a ToS field in the first packet is stored, in association with a 5-tuple corresponding to the first packet. As shown at blocks 1440 and 1450, the method comprises subsequently receiving a second packet, from the application server and matching a 5-tuple corresponding to the second packet to the stored 5-tuple corresponding to the first packet. As shown at blocks 1460 and 1470, the method further comprises rewriting a ToS field in the second packet, using the stored ToS value, and performing NAT for the second packet and forwarding the second packet to the UPF for forwarding to the wireless device. This procedure can be "instruction-based," in some embodiments, e.g., where a UPF-internal NAT gets a new instruction from the PCF. Blocks 1410-1480 correspond to steps 8-13 in FIGS. 7A and 7B.

Figure 15:
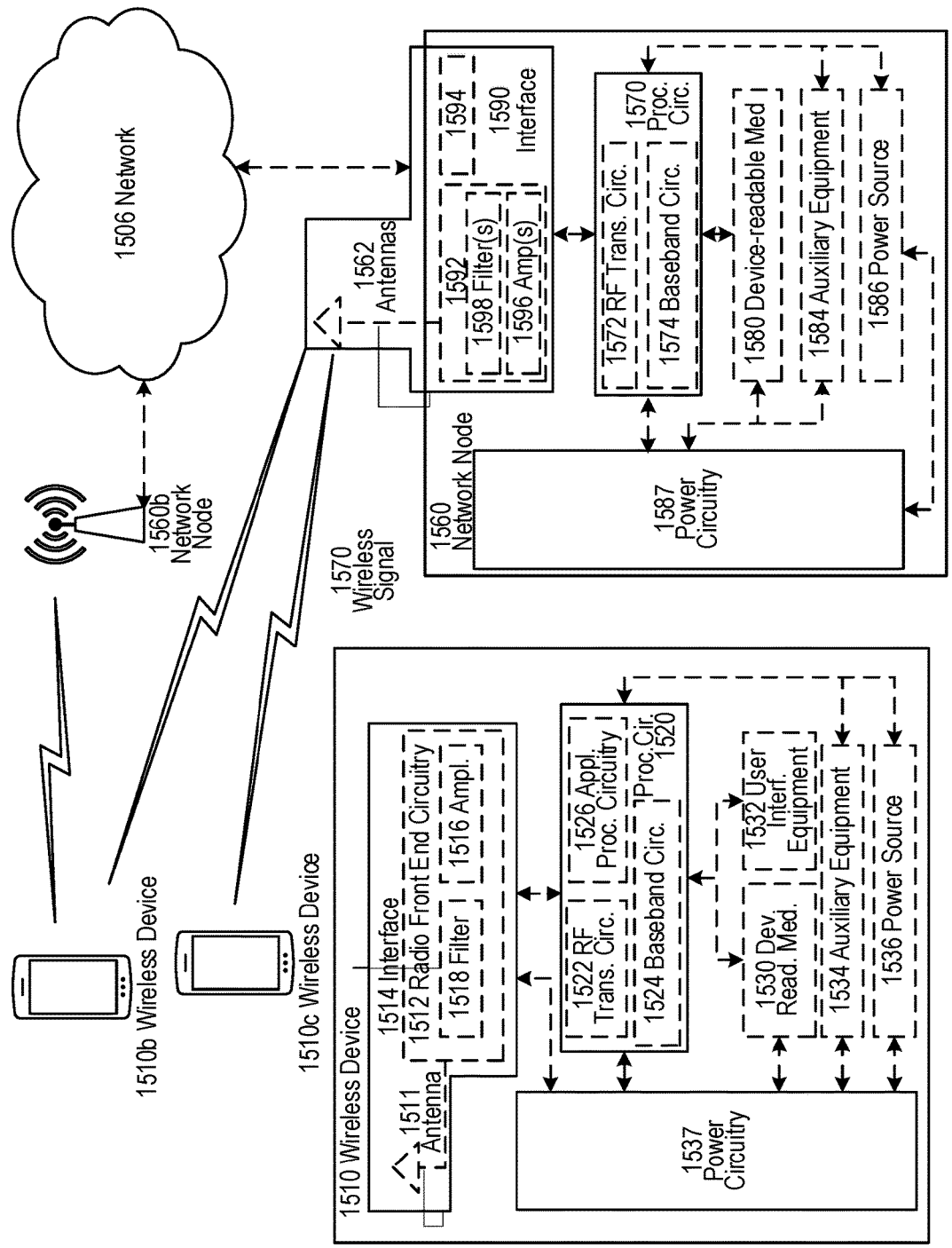
FIG. 15 illustrates an exemplary embodiment of a wireless network, according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 15. For simplicity, the wireless network of FIG. 15 only depicts network 1506, network nodes 1560 and 1560b, and WDs 1510, 1510b, and 1510c. In practice, a wireless network can further include any additional elements suitable to support communication between wireless devices or between a wireless device and another communication device, such as a landline telephone, a service provider, or any other network node or end device. Of the illustrated components, network node 1560 and wireless device (WD) 1510 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1506 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MM Es, S-GW, M-GW, etc.), core network functions (e.g., PCEF, PCRF, AMF, UPF, NEF, SMF, PCF, etc.), application functions (AF) associated with the core network, O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) or function capable, configured, arranged, and/or operable to enable and/or provide a wireless device with access to the wireless network or to provide some service to a wireless device that has accessed the wireless network.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1560 are depicted as single boxes located within a larger box, or nested within multiple boxes, in practice, a network node can comprise multiple different physical components that make up a single illustrated component (e.g., device readable medium 1580 can comprise multiple separate hard drives as well as multiple RAM modules).

Similarly, network node 1560 can be composed of multiple physically separate components (e.g., a NodeB component and an RNC component, or a BTS component and a BSC component, etc.), which can each have their own respective components. In certain scenarios in which network node 1560 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1560 can be configured to support multiple radio access technologies (RATs). In such embodiments, some components can be duplicated (e.g., separate device readable medium 1580 for the different RATs) and some components can be reused (e.g., the same antenna 1562 can be shared by the RATs). Network node 1560 can also include multiple sets of the various illustrated components for different wireless technologies integrated into network node 1560, such as, for example, GSM, WCDMA, LTE, NR, WiFi, or Bluetooth wireless technologies. These wireless technologies can be integrated into the same or different chip or set of chips and other components within network node 1560.

Processing circuitry 1570 can be configured to perform any determining, calculating, or similar operations (e.g., certain obtaining operations) described herein as being provided by a network node. These operations performed by processing circuitry 1570 can include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1560, either alone or in conjunction with other network node 1560 components (e.g., device readable medium 1580). Such functionality can include any of the various wireless features, functions, or benefits discussed herein.

For example, processing circuitry 1570 can execute instructions stored in device readable medium 1580 or in memory within processing circuitry 1570. In some embodiments, processing circuitry 1570 can include a system on a chip (SOC). As a more specific example, instructions (also referred to as a computer program product) stored in medium 1580 can include instructions that, when executed by processing circuitry 1570, can configure network node 1560 to perform operations corresponding to various exemplary methods (e.g., procedures) described herein.

In some embodiments, processing circuitry 1570 can include one or more of radio frequency (RF) transceiver circuitry 1572 and baseband processing circuitry 1574. In some embodiments, radio frequency (RF) transceiver circuitry 1572 and baseband processing circuitry 1574 can be on separate chips (or sets of chips), boards, or units, such as radio units and digital units. In alternative embodiments, part or all of RF transceiver circuitry 1572 and baseband processing circuitry 1574 can be on the same chip or set of chips, boards, or units.

In certain embodiments, some or all of the functionality described herein as being provided by a network node, base station, eNB or other such network device can be performed by processing circuitry 1570 executing instructions stored on device readable medium 1580 or memory within processing circuitry 1570. In alternative embodiments, some or all of the functionality can be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560 but are enjoyed by network node 1560 as a whole, and/or by end users and the wireless network generally.

Device readable medium 1580 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1570. Device readable medium 1580 can store any suitable instructions, data or information, including a computer program, software, an application including one or more of logic, rules, code, tables, etc. and/or other instructions capable of being executed by processing circuitry 1570 and, utilized by network node 1560. Device readable medium 1580 can be used to store any calculations made by processing circuitry 1570 and/or any data received via interface 1590. In some embodiments, processing circuitry 1570 and device readable medium 1580 can be considered to be integrated.

Interface 1590 is used in the wired or wireless communication of signaling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that can be coupled to, or in certain embodiments a part of, antenna 1562. Radio front end circuitry 1592 comprises filters 1598 and amplifiers 1596. Radio front end circuitry 1592 can be connected to antenna 1562 and processing circuitry 1570. Radio front end circuitry can be configured to condition signals communicated between antenna 1562 and processing circuitry 1570. Radio front end circuitry 1592 can receive digital data that is to be sent out to other network nodes or WDs via a wireless connection. Radio front end circuitry 1592 can convert the digital data into a radio signal having the appropriate channel and bandwidth parameters using a combination of filters 1598 and/or amplifiers 1596. The radio signal can then be transmitted via antenna 1562. Similarly, when receiving data, antenna 1562 can collect radio signals which are then converted into digital data by radio front end circuitry 1592. The digital data can be passed to processing circuitry 1570. In other embodiments, the interface can comprise different components and/or different combinations of components.

In certain alternative embodiments, network node 1560 may not include separate radio front end circuitry 1592, instead, processing circuitry 1570 can comprise radio front end circuitry and can be connected to antenna 1562 without separate radio front end circuitry 1592.

Similarly, in some embodiments, all or some of RF transceiver circuitry 1572 can be considered a part of interface 1590. In still other embodiments, interface 1590 can include one or more ports or terminals 1594, radio front end circuitry 1592, and RF transceiver circuitry 1572, as part of a radio unit (not shown), and interface 1590 can communicate with baseband processing circuitry 1574, which is part of a digital unit (not shown).

Antenna 1562 can include one or more antennas, or antenna arrays, configured to send and/or receive wireless signals. Antenna 1562 can be coupled to radio front end circuitry 1590 and can be any type of antenna capable of transmitting and receiving data and/or signals wirelessly. In some embodiments, antenna 1562 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1562 can be separate from network node 1560 and can be connectable to network node 1560 through an interface or port.

Antenna 1562, interface 1590, and/or processing circuitry 1570 can be configured to perform any receiving operations and/or certain obtaining operations described herein as being performed by a network node. Any information, data and/or signals can be received from a wireless device, another network node and/or any other network equipment. Similarly, antenna 1562, interface 1590, and/or processing circuitry 1570 can be configured to perform any transmitting operations described herein as being performed by a network node. Any information, data and/or signals can be transmitted to a wireless device, another network node and/or any other network equipment.

Power circuitry 1587 can comprise, or be coupled to, power management circuitry and can be configured to supply the components of network node 1560 with power for performing the functionality described herein. Power circuitry 1587 can receive power from power source 1586. Power source 1586 and/or power circuitry 1587 can be configured to provide power to the various components of network node 1560 in a form suitable for the respective components (e.g., at a voltage and current level needed for each respective component).

Power source 1586 can either be included in, or external to, power circuitry 1587 and/or network node 1560. For example, network node 1560 can be connectable to an external power source (e.g., an electricity outlet) via an input circuitry or interface such as an electrical cable, whereby the external power source supplies power to power circuitry 1587. As a further example, power source 1586 can comprise a source of power in the form of a battery or battery pack which is connected to, or integrated in, power circuitry 1587. The battery can provide backup power should the external power source fail. Other types of power sources, such as photovoltaic devices, can also be used.

Alternative embodiments of network node 1560 can include additional components beyond those shown in FIG. 15 that can be responsible for providing certain aspects of the network node's functionality, including any of the functionality described herein and/or any functionality necessary to support the subject matter described herein. For example, network node 1560 can include user interface equipment to allow and/or facilitate input of information into network node 1560 and to allow and/or facilitate output of information from network node 1560. This can allow and/or facilitate a user to perform diagnostic, maintenance, repair, and other administrative functions for network node 1560.

In some embodiments, a wireless device (WD, e.g., WD 1510) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 can include multiple sets of one or more of the illustrated components for different wireless technologies supported by WD 1510, such as, for example, GSM, WCDMA, LTE, NR, WiFi, WiMAX, or Bluetooth wireless technologies, just to mention a few. These wireless technologies can be integrated into the same or different chips or set of chips as other components within WD Antenna 1511 can include one or more antennas or antenna arrays, configured to send and/or receive wireless signals, and is connected to interface 1514. In certain alternative embodiments, antenna 1511 can be separate from WD 1510 and be connectable to WD 1510 through an interface or port. Antenna 1511, interface 1514, and/or processing circuitry 1520 can be configured to perform any receiving or transmitting operations described herein as being performed by a WD. Any information, data and/or signals can be received from a network node and/or another WD. In some embodiments, radio front end circuitry and/or antenna 1511 can be considered an interface.

As illustrated, interface 1514 comprises radio front end circuitry 1512 and antenna 1511. Radio front end circuitry 1512 comprise one or more filters 1518 and amplifiers 1516. Radio front end circuitry 1514 is connected to antenna 1511 and processing circuitry 1520 and can be configured to condition signals communicated between antenna 1511 and processing circuitry 1520. Radio front end circuitry 1512 can be coupled to or a part of antenna 1511. In some embodiments, WD 1510 may not include separate radio front end circuitry 1512; rather, processing circuitry 1520 can comprise radio front end circuitry and can be connected to antenna 1511. Similarly, in some embodiments, some or all of RF transceiver circuitry 1522 can be considered a part of interface 1514. Radio front end circuitry 1512 can receive digital data that is to be sent out to other network nodes or WDs via a wireless connection. Radio front end circuitry 1512 can convert the digital data into a radio signal having the appropriate channel and bandwidth parameters using a combination of filters 1518 and/or amplifiers 1516. The radio signal can then be transmitted via antenna 1511. Similarly, when receiving data, antenna 1511 can collect radio signals which are then converted into digital data by radio front end circuitry 1512. The digital data can be passed to processing circuitry 1520. In other embodiments, the interface can comprise different components and/or different combinations of components.

Processing circuitry 1520 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1510 functionality either alone or in combination with other WD 1510 components, such as device readable medium 1530. Such functionality can include any of the various wireless features or benefits discussed herein.

For example, processing circuitry 1520 can execute instructions stored in device readable medium 1530 or in memory within processing circuitry 1520 to provide the functionality disclosed herein. More specifically, instructions (also referred to as a computer program product) stored in medium 1530 can include instructions that, when executed by processing circuitry 1520, can configure wireless device 1510 to perform operations corresponding to various exemplary methods (e.g., procedures) described herein.

As illustrated, processing circuitry 1520 includes one or more of RF transceiver circuitry 1522, baseband processing circuitry 1524, and application processing circuitry 1526. In other embodiments, the processing circuitry can comprise different components and/or different combinations of components. In certain embodiments processing circuitry 1520 of WD 1510 can comprise a SOC. In some embodiments, RF transceiver circuitry 1522, baseband processing circuitry 1524, and application processing circuitry 1526 can be on separate chips or sets of chips. In alternative embodiments, part or all of baseband processing circuitry 1524 and application processing circuitry 1526 can be combined into one chip or set of chips, and RF transceiver circuitry 1522 can be on a separate chip or set of chips. In still alternative embodiments, part or all of RF transceiver circuitry 1522 and baseband processing circuitry 1524 can be on the same chip or set of chips, and application processing circuitry 1526 can be on a separate chip or set of chips. In yet other alternative embodiments, part or all of RF transceiver circuitry 1522, baseband processing circuitry 1524, and application processing circuitry 1526 can be combined in the same chip or set of chips. In some embodiments, RF transceiver circuitry 1522 can be a part of interface 1514. RF transceiver circuitry 1522 can condition RF signals for processing circuitry 1520.

In certain embodiments, some or all of the functionality described herein as being performed by a WD can be provided by processing circuitry 1520 executing instructions stored on device readable medium 1530, which in certain embodiments can be a computer-readable storage medium. In alternative embodiments, some or all of the functionality can be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 can be configured to perform any determining, calculating, or similar operations (e.g., certain obtaining operations) described herein as being performed by a WD. These operations, as performed by processing circuitry 1520, can include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 can be operable to store a computer program, software, an application including one or more of logic, rules, code, tables, etc. and/or other instructions capable of being executed by processing circuitry 1520. Device readable medium 1530 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1520. In some embodiments, processing circuitry 1520 and device readable medium 1530 can be considered to be integrated.

User interface equipment 1532 can include components that allow and/or facilitate a human user to interact with WD 1510. Such interaction can be of many forms, such as visual, audial, tactile, etc. User interface equipment 1532 can be operable to produce output to the user and to allow and/or facilitate the user to provide input to WD 1510. The type of interaction can vary depending on the type of user interface equipment 1532 installed in WD 1510. For example, if WD 1510 is a smart phone, the interaction can be via a touch screen; if WD 1510 is a smart meter, the interaction can be through a screen that provides usage (e.g., the number of gallons used) or a speaker that provides an audible alert (e.g., if smoke is detected). User interface equipment 1532 can include input interfaces, devices and circuits, and output interfaces, devices and circuits. User interface equipment 1532 can be configured to allow and/or facilitate input of information into WD 1510 and is connected to processing circuitry 1520 to allow and/or facilitate processing circuitry 1520 to process the input information. User interface equipment 1532 can include, for example, a microphone, a proximity or other sensor, keys/buttons, a touch display, one or more cameras, a USB port, or other input circuitry. User interface equipment 1532 is also configured to allow and/or facilitate output of information from WD 1510, and to allow and/or facilitate processing circuitry 1520 to output information from WD 1510. User interface equipment 1532 can include, for example, a speaker, a display, vibrating circuitry, a USB port, a headphone interface, or other output circuitry. Using one or more input and output interfaces, devices, and circuits, of user interface equipment 1532, WD 1510 can communicate with end users and/or the wireless network and allow and/or facilitate them to benefit from the functionality described herein.

Auxiliary equipment 1534 is operable to provide more specific functionality which may not be generally performed by WDs. This can comprise specialized sensors for doing measurements for various purposes, interfaces for additional types of communication such as wired communications etc. The inclusion and type of components of auxiliary equipment 1534 can vary depending on the embodiment and/or scenario.

Power source 1536 can, in some embodiments, be in the form of a battery or battery pack. Other types of power sources, such as an external power source (e.g., an electricity outlet), photovoltaic devices or power cells, can also be used. WD 1510 can further comprise power circuitry 1537 for delivering power from power source 1536 to the various parts of WD 1510 which need power from power source 1536 to carry out any functionality described or indicated herein. Power circuitry 1537 can in certain embodiments comprise power management circuitry. Power circuitry 1537 can additionally or alternatively be operable to receive power from an external power source; in which case WD 1510 can be connectable to the external power source (such as an electricity outlet) via input circuitry or an interface such as an electrical power cable. Power circuitry 1537 can also in certain embodiments be operable to deliver power from an external power source to power source 1536. This can be, for example, for the charging of power source 1536. Power circuitry 1537 can perform any converting or other modification to the power from power source 1536 to make it suitable for supply to the respective components of WD 1510.

Figure 16:
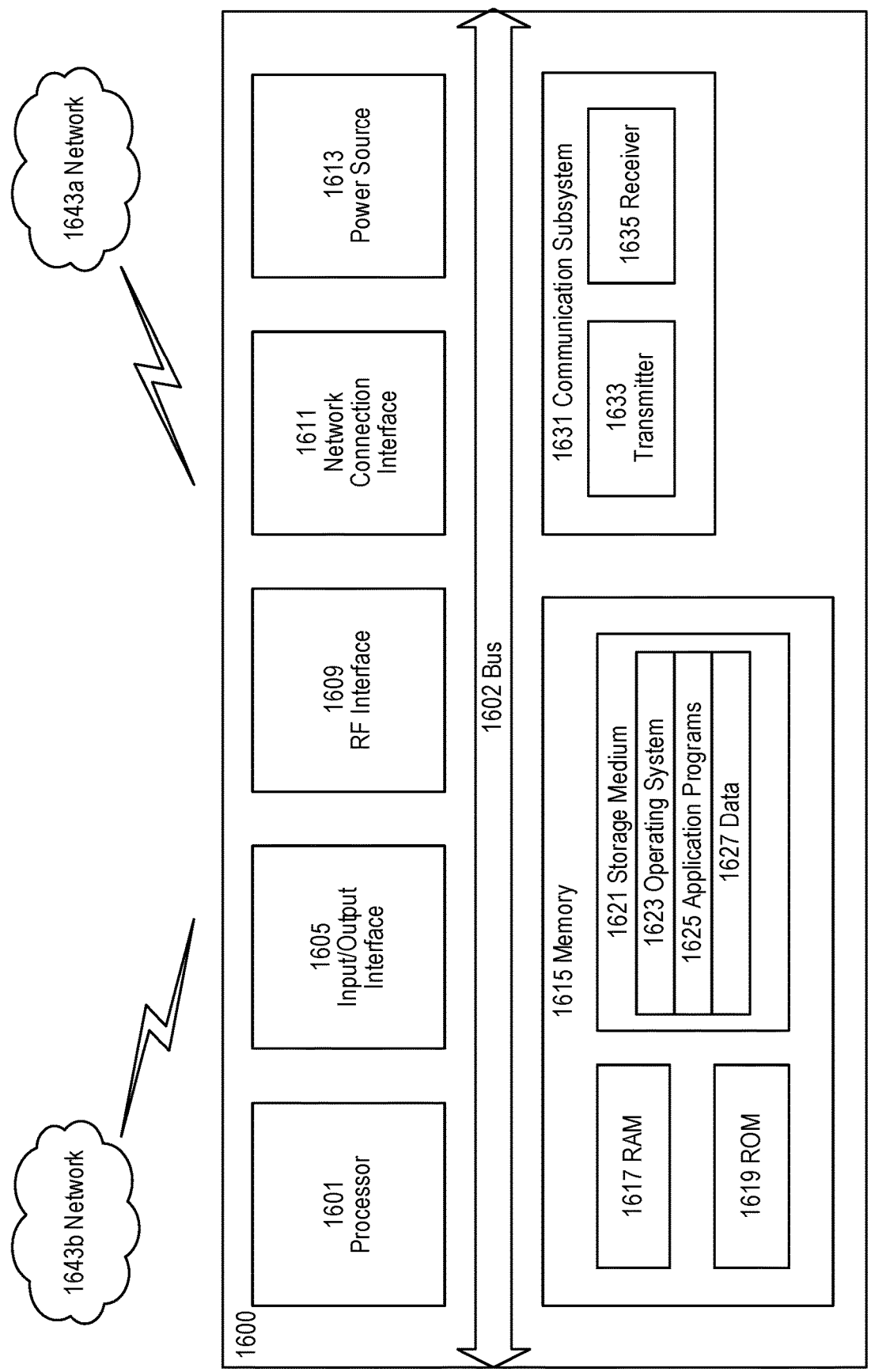
FIG. 16 illustrates an exemplary embodiment of a UE, according to various exemplary embodiments of the present disclosure.

FIG. 16 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1600 can be any UE identified by the 3rd Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE can be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1633, and/or any other component, or any combination thereof. Storage medium 1621 includes operating system 1623, application program 1625, and data 1627. In other embodiments, storage medium 1621 can include other similar types of information. Certain UEs can utilize all of the components shown in FIG. 16, or only a subset of the components. The level of integration between the components can vary from one UE to another UE. Further, certain UEs can contain multiple instances of a component, such as multiple processors, memories, transceivers, transmitters, receivers, etc.

In FIG. 16, processing circuitry 1601 can be configured to process computer instructions and data. Processing circuitry 1601 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 can include two central processing units (CPUs). Data can be information in a form suitable for use by a computer.

In the depicted embodiment, input/output interface 1605 can be configured to provide a communication interface to an input device, output device, or input and output device. UE 1600 can be configured to use an output device via input/output interface 1605. An output device can use the same type of interface port as an input device. For example, a USB port can be used to provide input to and output from UE 1600. The output device can be a speaker, a sound card, a video card, a display, a monitor, a printer, an actuator, an emitter, a smartcard, another output device, or any combination thereof. UE 1600 can be configured to use an input device via input/output interface 1605 to allow and/or facilitate a user to capture information into UE 1600. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 16, RF interface 1609 can be configured to provide a communication interface to RF components such as a transmitter, a receiver, and an antenna. Network connection interface 1611 can be configured to provide a communication interface to network 1643a. Network 1643a can encompass wired and/or wireless networks such as a local-area network (LAN), a wide-area network (WAN), a computer network, a wireless network, a telecommunications network, another like network or any combination thereof. For example, network 1643a can comprise a Wi-Fi network. Network connection interface 1611 can be configured to include a receiver and a transmitter interface used to communicate with one or more other devices over a communication network according to one or more communication protocols, such as Ethernet, TCP/IP, SONET, ATM, or the like. Network connection interface 1611 can implement receiver and transmitter functionality appropriate to the communication network links (e.g., optical, electrical, and the like). The transmitter and receiver functions can share circuit components, software or firmware, or alternatively can be implemented separately.

RAM 1617 can be configured to interface via bus 1602 to processing circuitry 1601 to provide storage or caching of data or computer instructions during the execution of software programs such as the operating system, application programs, and device drivers. ROM 1619 can be configured to provide computer instructions or data to processing circuitry 1601. For example, ROM 1619 can be configured to store invariant low-level system code or data for basic system functions such as basic input and output (I/O), startup, or reception of keystrokes from a keyboard that are stored in a non-volatile memory. Storage medium 1621 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1621 can be configured to include operating system 1623; application program 1625 such as a web browser application, a widget or gadget engine or another application; and data file 1627. Storage medium 1621 can store, for use by UE 1600, any of a variety of various operating systems or combinations of operating systems. For example, application program 1625 can include executable program instructions (also referred to as a computer program product) that, when executed by processor 1601, can configure UE 1600 to perform operations corresponding to various exemplary methods (e.g., procedures) described herein.

Storage medium 1621 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 can allow and/or facilitate UE 1600 to access computer-executable instructions, application programs or the like, stored on transitory or non-transitory memory media, to off-load data, or to upload data. An article of manufacture, such as one utilizing a communication system can be tangibly embodied in storage medium 1621, which can comprise a device readable medium.

In FIG. 16, processing circuitry 1601 can be configured to communicate with network 1643b using communication subsystem 1631. Network 1643a and network 1643b can be the same network or networks or different network or networks. Communication subsystem 1631 can be configured to include one or more transceivers used to communicate with network 1643*b*. For example, communication subsystem 1631 can be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver can include transmitter 1633 and/or receiver 1635 to implement transmitter or receiver functionality, respectively, appropriate to the RAN links (e.g., frequency allocations and the like). Further, transmitter 1633 and receiver 1635 of each transceiver can share circuit components, software or firmware, or alternatively can be implemented separately.

In the illustrated embodiment, the communication functions of communication subsystem 1631 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 can include cellular communication, Wi-Fi communication, Bluetooth communication, and GPS communication. Network 1643*b* can encompass wired and/or wireless networks such as a local-area network (LAN), a wide-area network (WAN), a computer network, a wireless network, a telecommunications network, another like network or any combination thereof. For example, network 1643*b* can be a cellular network, a Wi-Fi network, and/or a near-field network. Power source 1613 can be configured to provide alternating current (AC) or direct current (DC) power to components of UE 1600.

The features, benefits and/or functions described herein can be implemented in one of the components of UE 1600 or partitioned across multiple components of UE 1600. Further, the features, benefits, and/or functions described herein can be implemented in any combination of hardware, software or firmware. In one example, communication subsystem 1631 can be configured to include any of the components described herein. Further, processing circuitry 1601 can be configured to communicate with any of such components over bus 1602. In another example, any of such components can be represented by program instructions stored in memory that when executed by processing circuitry 1601 perform the corresponding functions described herein. In another example, the functionality of any of such components can be partitioned between processing circuitry 1601 and communication subsystem 1631. In another example, the non-computationally intensive functions of any of such components can be implemented in software or firmware and the computationally intensive functions can be implemented in hardware.

Figure 17:
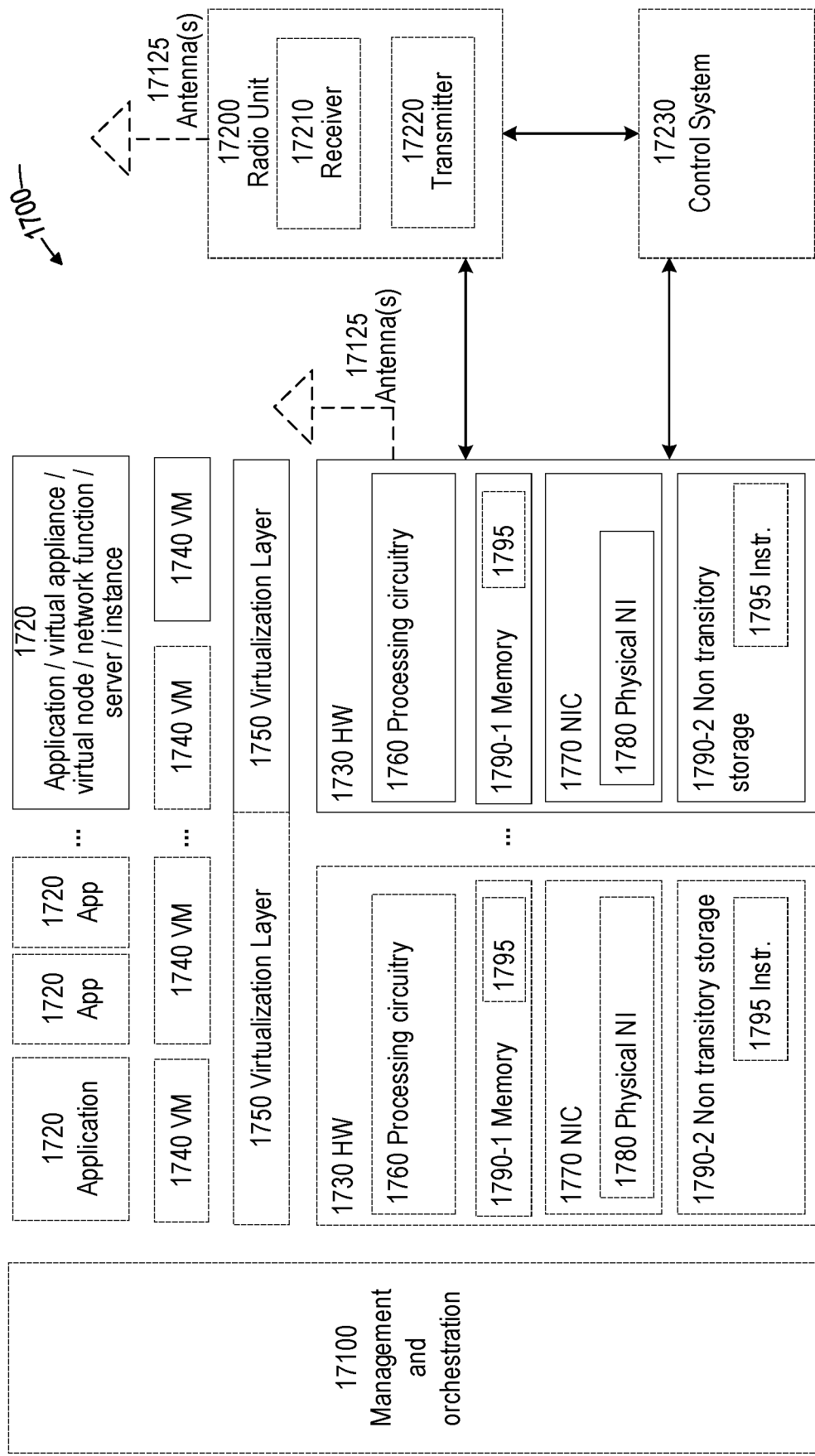
FIG. 17 is a block diagram illustrating an exemplary virtualization environment usable for implementation of various embodiments described herein.

FIG. 17 is a schematic block diagram illustrating a virtualization environment 1700 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node can be entirely virtualized.

The functions can be implemented by one or more applications 1720 (which can alternatively be called software instances, virtual appliances, network functions, application functions, virtual nodes, virtual network functions, etc.) operative to implement some of the features, functions, and/or benefits of some of the embodiments disclosed herein. Applications 1720 (including, e.g., network functions and/or application functions) are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700 can include general-purpose or special-purpose network hardware devices (or nodes) 1730 comprising a set of one or more processors or processing circuitry 1760, which can be commercial off-the-shelf (COTS) processors, dedicated Application Specific Integrated Circuits (ASICs), or any other type of processing circuitry including digital or analog hardware components or special purpose processors. Each hardware device can comprise memory 1790-1 which can be non-persistent memory for temporarily storing instructions 1795 or software executed by processing circuitry 1760. For example, instructions 1795 can include program instructions (also referred to as a computer program product) that, when executed by processing circuitry 1760, can configure hardware node 1720 to perform operations corresponding to various exemplary methods (e.g., procedures) described herein. Such operations can also be attributed to virtual node(s) 1720 that is/are hosted by hardware node 1730.

Each hardware device can comprise one or more network interface controllers (NICs) 1770, also known as network interface cards, which include physical network interface 1780. Each hardware device can also include non-transitory, persistent, machine-readable storage media 1790-2 having stored therein software 1795 and/or instructions executable by processing circuitry 1760. Software 1795 can include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and can be run by a corresponding virtualization layer 1750 or hypervisor. Different embodiments of the instance of virtual appliance 1720 can be implemented on one or more of virtual machines 1740, and the implementations can be made in different ways.

During operation, processing circuitry 1760 executes software 1795 to instantiate the hypervisor or virtualization layer 1750, which can sometimes be referred to as a virtual machine monitor (VMM). Virtualization layer 1750 can present a virtual operating platform that appears like networking hardware to virtual machine 1740.

As shown in FIG. 17, hardware 1730 can be a standalone network node with generic or specific components. Hardware 1730 can comprise antenna 17225 and can implement some functions via virtualization. Alternatively, hardware 1730 can be part of a larger cluster of hardware (e.g., such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1740 can be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 can be coupled to one or more antennas 17225. Radio units 17200 can communicate directly with hardware nodes 1730 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 17230, which can alternatively be used for communication between the hardware nodes 1730 and radio units 17200.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

Example embodiments of the techniques and apparatus described herein include, but are not limited to, the following enumerated examples:

The invention claimed is:

1. A method, in one or more network nodes acting as a User Plane Function, the method comprising:
   receiving, from a wireless device, a first packet targeted to an application server;
   mapping the first packet to a predetermined packet detection rule (PDR) based on a value of a type-of-service (ToS) field in the first packet; and
   adding a 5-tuple associated with the first packet to the predetermined PDR.

2. The method of claim 1, wherein mapping the first packet to the predetermined PDR is further based on one or both of a source IP address and a destination IP address of the first packet.

3. The method of claim 2, wherein the source IP address of the first packet is an IP address for a mobile gateway associated with the wireless device.

4. The method of claim 1, wherein the ToS field in the first packet is one of:
   an optional header field in the first packet; or
   a differentiated services code point (DSCP) field in the first packet; or
   a traffic class field in the first packet.

5. The method of claim 1, wherein the method further comprises, prior to receiving the first packet:
   receiving, from a policy control function (PCF), an instruction to create a new PDR, the instruction comprising an IP address for the wireless device, the value of the ToS field, and a quality-of-service (QoS) reference or a charging policy; and
   storing the IP address, the value of the ToS field, and the QoS reference or the charging policy as the predetermined PDR.

6. The method of claim 1, wherein the method further comprises:
   receiving a second packet, from the application server;
   mapping the second packet to the predetermined PDR by matching a 5-tuple of the second packet to the 5-tuple in the predetermined PDR; and
   applying a QoS flow and/or a charging policy for handling the second packet, according to the predetermined PDR.

7. A network node configured to operate in a communication network, the network node comprising:
   interface circuitry configured to communicatively couple the network node with a wireless device and an Application Server (AS) that supports one or more application services used by the wireless device; and
   processing circuitry that is operatively coupled to the interface circuitry and configured to implement a User Plane Function (UPF) in the communication network, whereby the UPF is configured to:
      receive, from the wireless device, a first packet targeted to an application server;
      map the first packet to a predetermined packet detection rule (PDR) based on a value of a type-of-service (ToS) field in the first packet; and
      add a 5-tuple associated with the first packet to the predetermined PDR.

8. The network node of claim 7, wherein the UPF is configured to map the first packet to the predetermined PDR based further on one or both of a source IP address and a destination IP address of the first packet.

9. The network node of claim 8, wherein the source IP address of the first packet is an IP address for a mobile gateway associated with the wireless device.

10. The network node of claim 7, wherein the ToS field in the first packet is one of:
    an optional header field in the first packet; or
    a differentiated services code point (DSCP) field in the first packet; or
    a traffic class field in the first packet.

11. The network node of claim 7, wherein the UPF is further configured to, prior to receiving the first packet:
    receive, from a policy control function, PCF, an instruction to create a new PDR, the instruction comprising an IP address for the wireless device, the value of the ToS field, and a quality-of-service (QoS) reference or charging policy; and
    store the IP address, the value of the ToS field, and the QoS reference or charging policy as the predetermined PDR.

12. The network node of claim 7, wherein the UPF is configured to:
    receive a second packet, from the AS;
    map the second packet to the predetermined PDR by matching a 5-tuple of the second packet to the 5-tuple in the predetermined PDR; and
    apply a QoS flow and/or a charging policy for handling the second packet, according to the predetermined PDR.

13. A non-transitory computer-readable storage medium storing computer-readable program instructions that, when executed on processing circuitry of a network node, cause the network node to:
    receive, from a wireless device, a first packet targeted to an application server;
    map the first packet to a predetermined packet detection rule (PDR) based on a value of a type-of-service (ToS) field in the first packet; and
    add a 5-tuple associated with the first packet to the predetermined PDR.

14. The non-transitory computer-readable storage medium of claim 13, wherein mapping the first packet to the predetermined PDR is further based on one or both of a source IP address and a destination IP address of the first packet.

15. The non-transitory computer-readable storage medium of claim 14, wherein the source IP address of the first packet is an IP address for a mobile gateway associated with the wireless device.

16. The non-transitory computer-readable storage medium of claim 13, wherein the ToS field in the first packet is one of:
    an optional header field in the first packet; or
    a differentiated services code point (DSCP) field in the first packet; or
    a traffic class field in the first packet.

17. The non-transitory computer-readable storage medium of claim 13, wherein the processing circuitry of the network node further causes the network node to, prior to receiving the first packet:
    receive, from a policy control function, PCF, an instruction to create a new PDR, the instruction comprising an IP address for the wireless device, the value of the ToS field, and a quality-of-service (QoS) reference or charging policy; and
    store the IP address, the value of the ToS field, and the QoS reference or charging policy as the predetermined PDR.

18. The non-transitory computer-readable storage medium of claim 13, wherein the processing circuitry of the network node further causes the network node to:
    receive a second packet, from the AS;
    map the second packet to the predetermined PDR by matching a 5-tuple of the second packet to the 5-tuple in the predetermined PDR;
    apply a QoS flow and/or a charging policy for handling the second packet, according to the predetermined PDR.

* * * * *